US010397427B2

(12) United States Patent
Kubo et al.

(10) Patent No.: US 10,397,427 B2
(45) Date of Patent: Aug. 27, 2019

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Hideki Kubo, Kawasaki (JP); Hitoshi Fukamachi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 209 days.

(21) Appl. No.: 15/227,167

(22) Filed: Aug. 3, 2016

(65) Prior Publication Data

US 2017/0041479 A1 Feb. 9, 2017

(30) Foreign Application Priority Data

Aug. 6, 2015 (JP) ................................ 2015-156035
Jun. 29, 2016 (JP) ................................ 2016-129141

(51) Int. Cl.

| | |
|---|---|
| ***B33Y 10/00*** | (2015.01) |
| ***B33Y 30/00*** | (2015.01) |
| ***B33Y 50/02*** | (2015.01) |
| ***H04N 1/00*** | (2006.01) |
| ***B41J 2/01*** | (2006.01) |

(Continued)

(52) U.S. Cl.

CPC .......... *H04N 1/00827* (2013.01); *B33Y 10/00* (2014.12); *B33Y 30/00* (2014.12); *B41J 2/01* (2013.01); *G02B 5/201* (2013.01); *H04N 1/32203* (2013.01); *B29C 64/386* (2017.08);

(Continued)

(58) Field of Classification Search

CPC .... H04N 1/00827; B33Y 10/00; B33Y 30/00; B33Y 50/02; B29C 64/386

See application file for complete search history.

(56) References Cited

U.S. PATENT DOCUMENTS

| | | | | |
|---|---|---|---|---|
| 9,150,012 | B2 | 10/2015 | Ochiai et al. | |
| 9,889,609 | B2 * | 2/2018 | Cudak | .................... B25J 9/1679 |

(Continued)

FOREIGN PATENT DOCUMENTS

| | | | |
|---|---|---|---|
| EP | 2189272 | A2 | 5/2010 |
| JP | 2004-299058 | A | 10/2004 |

OTHER PUBLICATIONS

European search report issued in corresponding application No. 16001704.2 dated Dec. 12, 2016.

*Primary Examiner* — Mark A Connolly

(74) *Attorney, Agent, or Firm* — Carter, DeLuca & Farrell LLP

(57) ABSTRACT

The image processing apparatus in the present invention is an image processing apparatus that supplies roughness shape data to an image forming apparatus that forms a roughness shape based on a roughness shape of an object to be reproduced. The image processing apparatus includes: an input reception unit configured to receive an input of information representing the roughness shape of the object to be reproduced; an acquisition unit configured to acquire output characteristics relating to a roughness shape that the image forming apparatus can output; and a generation unit configured to generate roughness shape data that is supplied to the image forming apparatus based on the information representing the roughness shape of the object to be reproduced and the output characteristics.

17 Claims, 27 Drawing Sheets

(51) Int. Cl.
*H04N 1/32* (2006.01)
*G02B 5/20* (2006.01)
*B29C 64/386* (2017.01)

(52) U.S. Cl.
CPC ..... *B33Y 50/02* (2014.12); *G05B 2219/49023* (2013.01)

(56) References Cited

U.S. PATENT DOCUMENTS

2004/0183796 A1* 9/2004 Velde ........................ B41C 1/00 345/419
2004/0189768 A1* 9/2004 Konno ................... B41J 3/4073 347/101
2013/0096708 A1* 4/2013 Danks ................. B29C 67/0088 700/98
2016/0001549 A1 1/2016 Kubo et al.

* cited by examiner

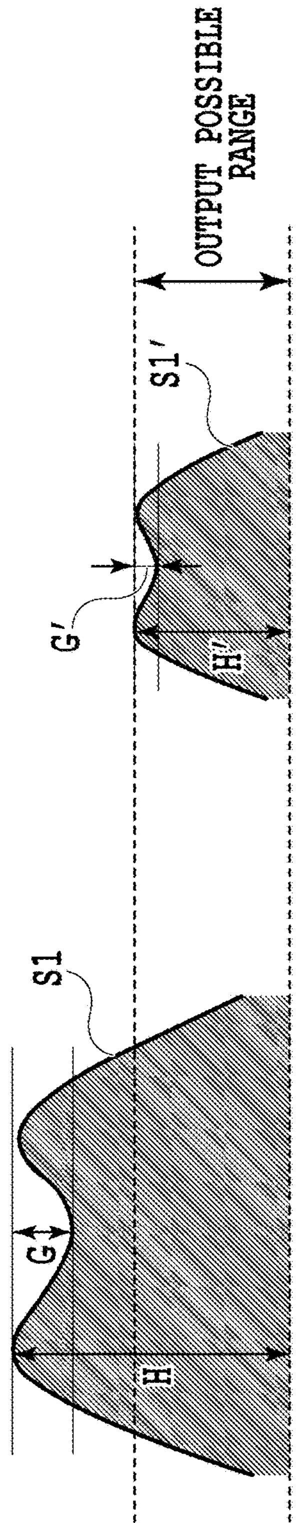
FIG.1A
FIG.1B
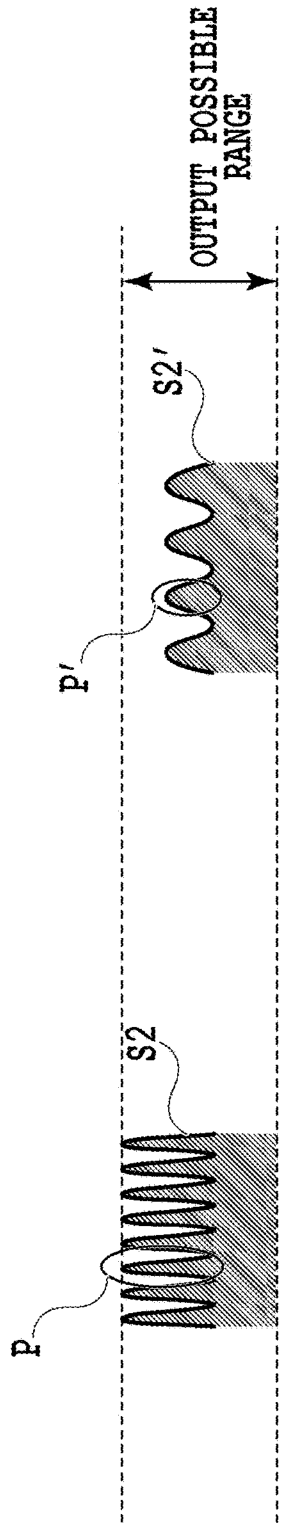
FIG.1C
FIG.1D

| FIG.8A |
| --- |
| FIG.8B |

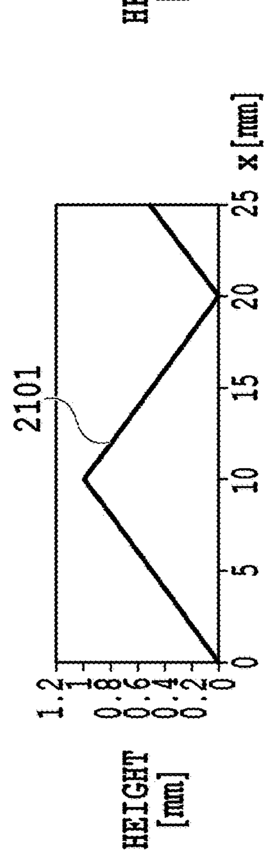
FIG.22A
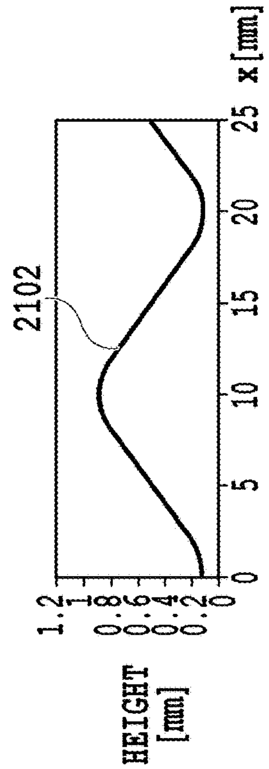
FIG.22B
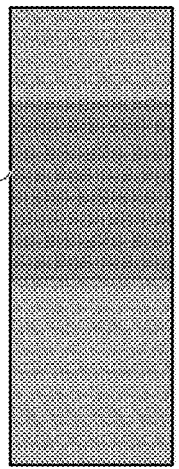
FIG.22C
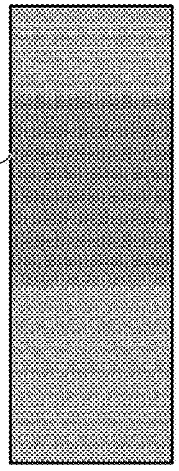
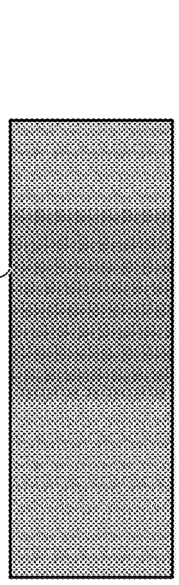
FIG.22D
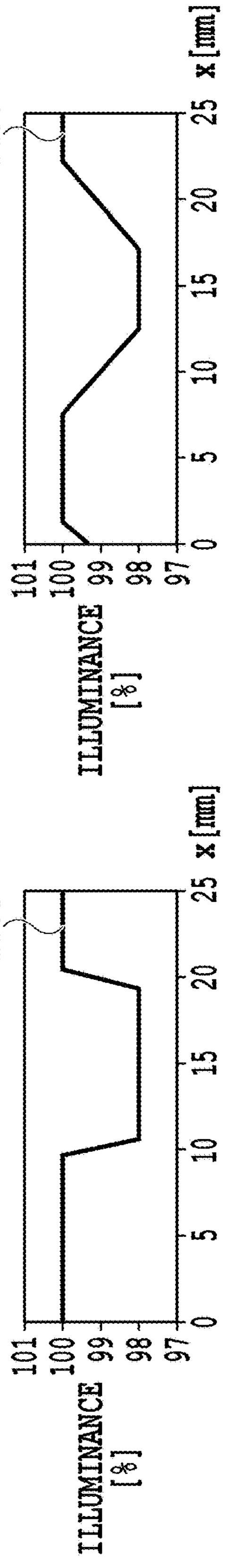
FIG.22E
FIG.22F

IMAGE PROCESSING APPARATUS, IMAGE PROCESSING METHOD, AND STORAGE MEDIUM

BACKGROUND OF THE INVENTION

Field of the Invention

The present invention relates to an image processing apparatus that generates roughness shape data, an image processing method, and a storage medium that stores programs for implementing the apparatus and the method.

Description of the Related Art

As a method of forming a three-dimensional shape, such as a roughness shape and a structure, a layer stacking method is known in which an ink jet or electrophotographic image forming apparatus stacks a curable resin printing material or the like. As the image forming apparatus such as this that performs formation of a roughness shape and a structure, an image forming apparatus is known that can reproduce a stereoscopic effect and a texture by performing formation of a roughness shape and printing of an image on a printing medium almost simultaneously. Japanese Patent Laid-Open No. 2004-299058 has disclosed a method of representing a stereoscopic effect and a texture by forming and stacking a roughness layer for representing large roughness, a roughness layer for representing fine roughness, and a layer for drawing an image one on top of another.

SUMMARY OF THE INVENTION

In general, there is a case where an image forming apparatus that forms a roughness shape cannot reproduce a roughness shape faithfully even by forming the roughness shape based on three-dimensional shape data. The reason is that the curable resin printing material has the surface tension and wetting spreading characteristics. For example, even in the case where the image forming apparatus outputs a resin printing material based on the roughness shape data specifying a sharp roughness shape in order to reproduce a sharp roughness shape, the shape changes before the resin printing material solidifies, and therefore, a sharp roughness shape cannot be reproduced. Alternatively, even in the case where the image forming apparatus outputs the resin printing material based on the roughness shape data specifying a shape in which the difference of elevation in roughness is large, the resin printing material for forming a convex portion spreads up to a concave portion, and therefore, the difference of elevation cannot be maintained.

Because of this, an object of the present invention is to generate data for an image forming apparatus to output a structure so that the image forming apparatus that reproduces a structure having a roughness shape can form an output having a desired texture. The image processing apparatus according to the present invention is an image processing apparatus that supplies roughness shape data to an image forming apparatus that forms a roughness shape based on a roughness shape of an object to be reproduced, and includes an input reception unit configured to receive an input of information representing the roughness shape of the object to be reproduced, an acquisition unit configured to acquire output characteristics relating to a roughness shape that the image forming apparatus can output, and a generation unit configured to generate the roughness shape data that is supplied to the image forming apparatus based on the information representing the roughness shape of the object to be reproduced and the output characteristics.

Further features of the present invention will become apparent from the following description of exemplary embodiments (with reference to the attached drawings).

BRIEF DESCRIPTION OF THE DRAWINGS

FIG. 1A to FIG. 1D are schematic diagrams showing output examples of a roughness shape;

FIG. 22A is a diagram showing a height distribution of a roughness shape represented by roughness shape data in the third embodiment;

FIG. 22B is a diagram showing a height distribution of a formed roughness shape in the third embodiment;

FIG. 22C is a diagram showing an illuminance distribution of a roughness shape represented by roughness shape data in the third embodiment;

FIG. 22D is a diagram showing an illuminance distribution of a formed roughness shape in the third embodiment;

FIG. 22E is a diagram showing an ideal illuminance distribution E1 in the third embodiment;

FIG. 22F is a diagram showing a predicted illuminance distribution E2 in the third embodiment;

FIG. 24 is a diagram showing the relationship of FIGS. 24A and 24B;

DESCRIPTION OF THE EMBODIMENTS

Figure 2:
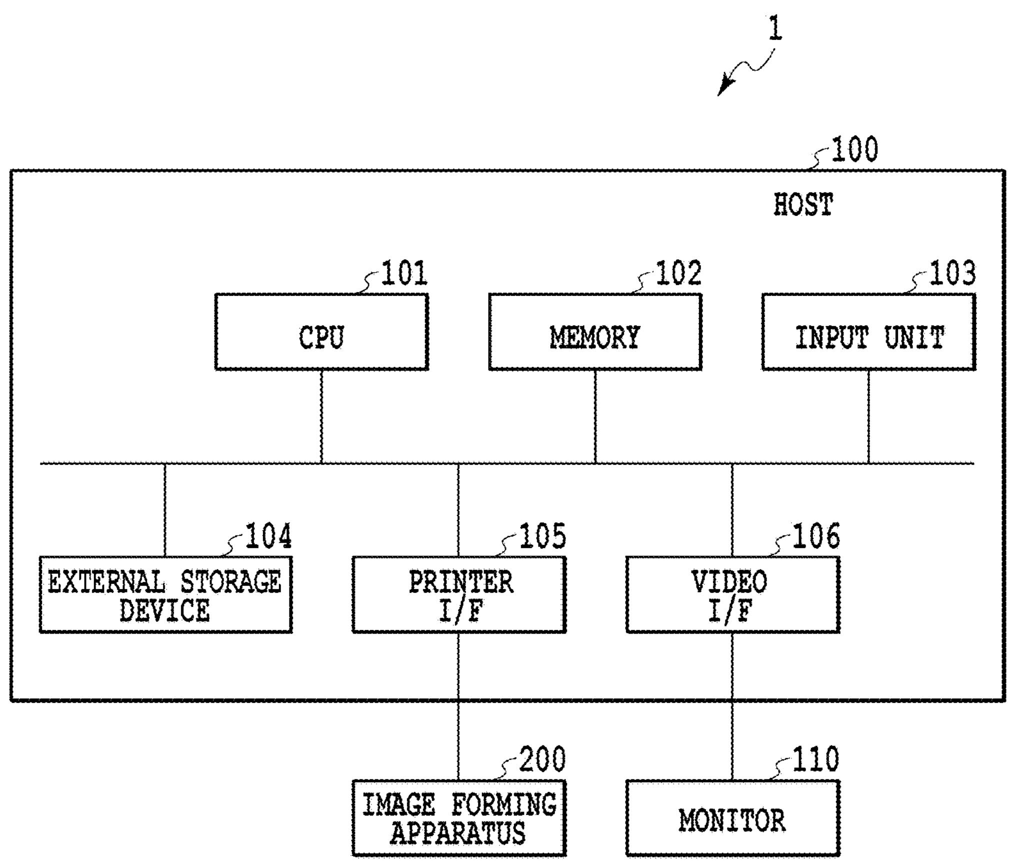
FIG. 2 is a block diagram showing an outline configuration of an image forming system in a first embodiment.

Hereinafter, embodiments for embodying the present invention are explained with reference to the drawings. However, the components described in these embodiments are merely exemplary and are not intended to limit the scope of the present invention to those embodiments. Explanation is given by attaching the same reference letters or numerals to the same configurations.

First Embodiment

In a first embodiment, a method of correcting roughness shape data of an object to be reproduced in accordance with an image forming apparatus that outputs a structure is explained. In particular, in the first embodiment, in order to represent a desired texture, the frequency and amplitude of the roughness shape data are corrected. Before explaining the configuration of the first embodiment, a correction method of roughness shape data is considered. In the case where the image forming apparatus cannot reproduce a shape specified by roughness shape data as the results of producing an output based on the roughness shape data, a method is conceivable that performs correction, such as enlargement and reduction, for the roughness shape data. However, only by simply performing enlargement or reduction for the roughness shape data, there is a case where it is not possible to output a roughness shape representing a desired texture. An example in which it is not possible to output a roughness shape representing a desired texture is shown in each schematic diagram of FIG. 1A to FIG. 1D. FIG. 1A is a schematic diagram showing an example of a roughness shape S1. Reference letters H and G indicate the maximum height of the roughness shape S1 and a difference of elevation of the roughness shape S1, respectively. FIG. 1B is a schematic diagram showing an example of a roughness shape S1'. Reference letters H' and G' indicate the maximum height of the roughness shape S1' and a difference of elevation of the roughness shape S1', respectively. The roughness shape S1' is the roughness shape S1 reduced so that that the height H' falls within an output possible range of the image forming apparatus while maintaining the relationship of similarity. As the roughness shape is reduced from S1 to S1', the difference of elevation of the roughness shape is also reduced from G to G'. In the case where the difference of elevation G of the roughness shape S1 is comparatively small, the difference of elevation G' after the reduction will be too small to recognize, and therefore, the contrast of shade will be lost.

Another example in which it is not possible to output a roughness shape representing a desired texture only by simply performing enlargement or reduction for roughness shape data is explained below. FIG. 1C is a schematic diagram showing an example of a roughness shape S2. A convex portion P in the roughness shape S2 is a sharp shape (e.g., the sectional shape is like a sawtooth wave). FIG. 1D is a schematic diagram showing an example of a roughness shape S2' that is actually output. A convex portion P' in the roughness shape S2' is a dull shape compared to the convex portion P in the roughness shape S2. The reason is that the resin printing material output by the image forming apparatus collapses before solidifies with the sharp shape being kept due to the surface tension and wetting spreading characteristics in accordance with the kind of resin printing material. In the case where reduction is performed for the roughness shape data so as to avoid the influence of the characteristics of the resin printing material, the convex portion P' of the roughness shape S2' becomes a dull shape and the sharpness of the shade represented by the roughness shape S2 will be lost. Consequently, in the first embodiment, the roughness shape data is corrected so that the texture of the resin printing material output by the image forming apparatus is maintained.

<Outline Configuration of Image Forming System>

FIG. 2 is a block diagram showing an outline configuration of an image forming system 1 in the present embodiment. In the image forming system 1 in FIG. 2, a host 100 is, for example, a computer and includes a CPU 101, a memory 102, an input unit 103 consisting of a keyboard, a mouse, etc., and an external storage device 104. Further, the host 100 includes a communication interface (hereinafter, described as printer I/F 105) with an image forming apparatus 200 and a communication interface (hereinafter, described as video I/F 106) with a monitor 110. The CPU 101 performs various kinds of processing in accordance with programs stored in the memory 102. The programs are stored in the external storage device 104 or supplied from an externally connected information processing apparatus, not shown. The host 100 receives inputs of various kinds of information through the input unit 103 as well as outputting various kinds of information to the monitor 110 via the video I/F 106. Further, the host 100 is connected with the image forming apparatus 200 via the printer I/F 105 and transmits image data on which processing has been performed to the image forming apparatus 200 to cause the image forming apparatus 200 to form an image. It is also possible for the host 100 to receive various kinds of information, such as the size of the roughness shape that can be output, from the image forming apparatus 200 via the printer I/F 105. In the present embodiment, the host 100 constitutes an image processing apparatus.

<Outline Configuration of Image Forming Apparatus>

Figure 3:
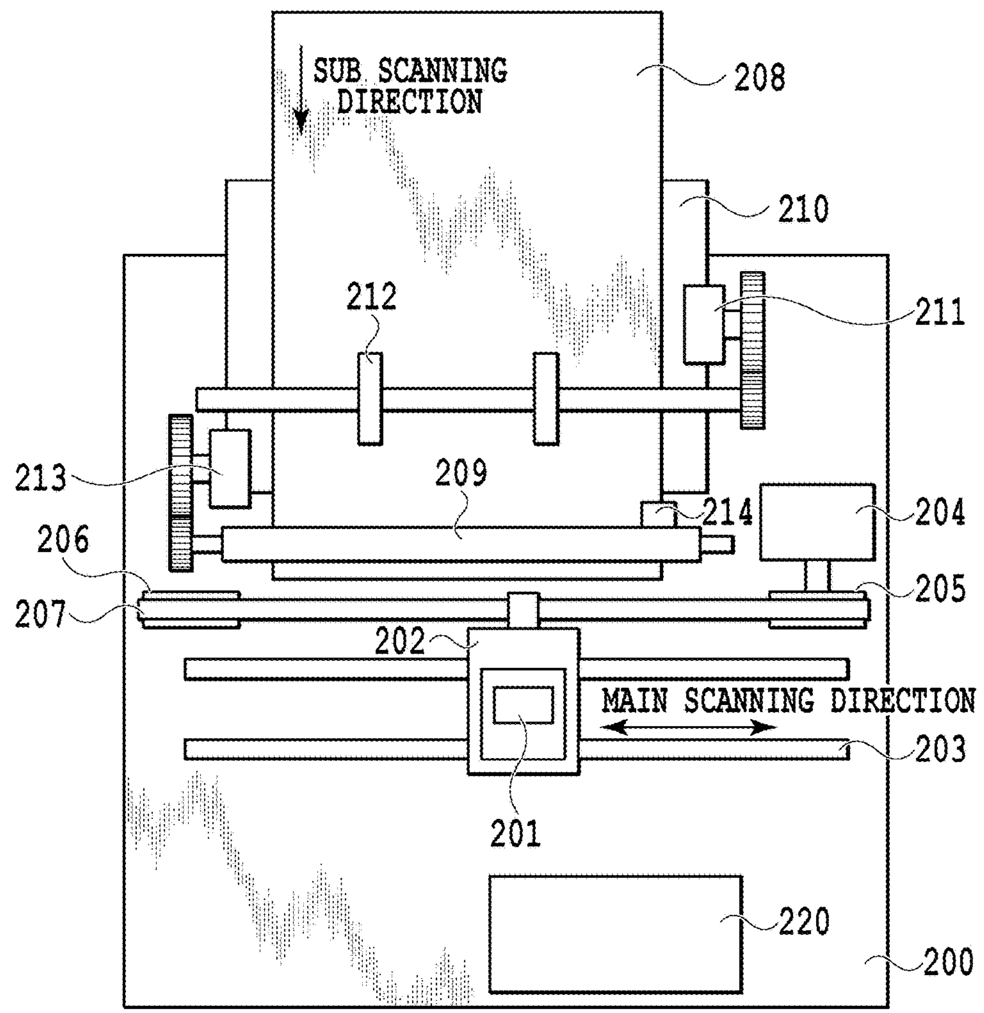
FIG. 3 is a schematic diagram explaining an outline configuration of an image forming apparatus in the first embodiment.

FIG. 3 is a schematic diagram explaining an outline configuration of the image forming apparatus 200 in the present embodiment. In the present embodiment, the image forming apparatus 200 is implemented by an ink jet printer that forms a roughness layer and an image layer by using a plurality of kinds of ink. A head cartridge 201 of the image forming apparatus 200 has a print head including a plurality of ejection ports and a plurality of color ink tanks for supplying ink to the print head and is provided with a connector for transmitting and receiving signals or the like to drive each ejection port of the print head. The ink tank storing a liquid resin ink for forming a roughness layer is provided independently of the ink tanks storing a plurality of color material inks for forming an image layer. The head cartridge 201 is mounted on a carriage 202 in an exchangeable manner after being positioned and the carriage 202 is provided with a connector holder for transmitting a drive signal or the like to the head cartridge 201 via the above-described connector. A reference numeral 203 indicates a guide shaft. The carriage 202 is designed so as to be capable of reciprocating along the guide shaft 203. Specifically, the carriage 202 is driven via drive mechanisms, such as a motor pulley 205, a driven pulley 206, and a timing belt 207, by using a main scan motor 204 as a drive source and at the same time, the position and movement of the carriage 202 are controlled. The movement of the carriage along the guide shaft 203 is referred to as a "main scan" and the direction of the movement is referred to as a "main scanning direction".

A printing medium 208, such as a printing sheet, is mounted on an auto sheet feeder 210 (hereinafter, described as ASF). In the case where the image forming apparatus 200 outputs an image, a pickup roller 212 rotates via a gear due to the drive of a paper feed motor 211 and paper is fed one by one from the ASF 210 separately. Further, the printing medium 208 is conveyed to an image formation start position in opposition to the ejection port surface of the head cartridge 201 on the carriage 202 due to the rotation of a conveyance roller 209. The conveyance roller 209 is driven via a gear using a line feeder (LF) motor 213 as a drive source. Determination of whether the printing medium 208 has been fed and the settlement of the cueing position at the time of paper feed of the printing medium 208 are performed at the point in time of passing of the printing medium 208 by a paper end sensor 214. The head cartridge 201 mounted on the carriage 202 is held so that the ejection port surface protrudes downward from the carriage 202 and becomes parallel to the printing medium 208. The control unit 220 includes a CPU, a storage device, etc., and the image forming apparatus 200 receives image data and roughness shape data supplied from the outside, such as the host 100, and controls the operation of each part of the image forming apparatus 200 based on the received data. It can be said that the roughness shape data of the present embodiment is an aspect of information representing a roughness shape. As described above, the configuration example of the image forming apparatus 200 of the present embodiment is explained, but a configuration other than the above-described ink jet printer may be accepted as long as it is possible to form a roughness layer and an image layer by using a plurality of printing materials.

<Image Forming Operation>

Next, the image forming operation in the image forming apparatus 200 in FIG. 3 is explained. First, in the case where the printing medium 208 is conveyed to a predetermined printing start position, the carriage 202 moves on the printing medium 208 along the guide shaft 203 and inks are ejected from the ejection ports of the print head during the movement. Then, in the case where the carriage 202 moves up to one end of the guide shaft 203, the conveyance roller 209 conveys the printing medium 208 in the direction perpendicular to the scanning direction of the cartridge 202 by a predetermined amount. This conveyance of the printing medium 208 is referred to as "paper feed" or "sub scan" and the conveyance direction is referred to as the "paper feed direction" or the "sub scanning direction". In the case where the conveyance of the printing medium. 208 by the predetermined amount is completed, the carriage 202 moves again along the guide shaft 203. By repeating scan and paper feed by the carriage 202 of the print head in this manner, an image is formed on the entire printing medium 208.

Figure 4:
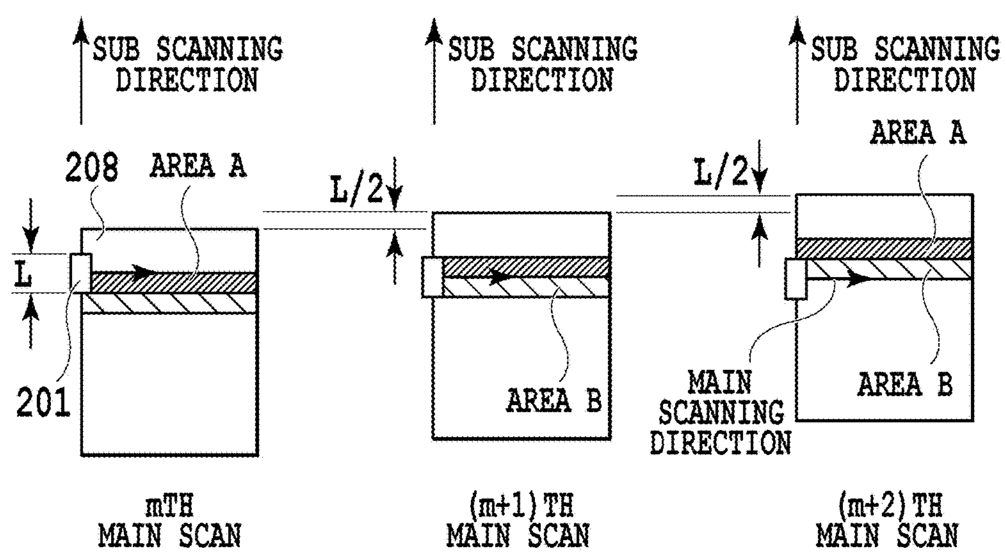
FIG. 4 is a schematic diagram explaining an image forming operation in the first embodiment.

FIG. 4 is a diagram showing an operation example to form a roughness layer and an image layer by the print head scanning twice on the same line of the printing medium 208 in the image forming apparatus 200 in the present embodiment. Here, an example is explained in which half of the print head with a width L (L/2) is used for forming a roughness layer and the remaining half is used for forming an image layer and each time one-time scan is completed, the printing medium 208 is conveyed in the sub scanning direction by a distance L/2 each time. The number of arranged ink tanks of liquid resin ink, which are mounted on the head cartridge 201, is large compared to the number of color material ink tanks. First, in an mth scan, a roughness layer is formed by ejecting the liquid resin ink in an area A of the printing medium 208. Next, in an (m+1)th scan, a roughness layer is formed by ejecting the liquid resin ink in an area B of the printing medium 208 and at the same time, an image layer is formed by ejecting a plurality of color material inks in the area A on the roughness layer formed in the mth scan. The image forming apparatus 200 forms the roughness layer and the image layer on the printing medium 208 by repeating the above-described operation. In the present embodiment, the roughness layer and the image layer are formed by performing the scan twice, but the present embodiment is not limited to this. For example, it may also be possible to perform superimposed printing by repeating the main scan a plurality of times in order to form the roughness layer in the area A of the printing medium 208. In the present embodiment, the kind of the printing medium 208 is not limited in particular and it is possible to use various kinds of material, such as paper and a plastic film, as long as they are compatible with image formation by the image forming apparatus 200.

<Roughness Shape>

Figure 5:
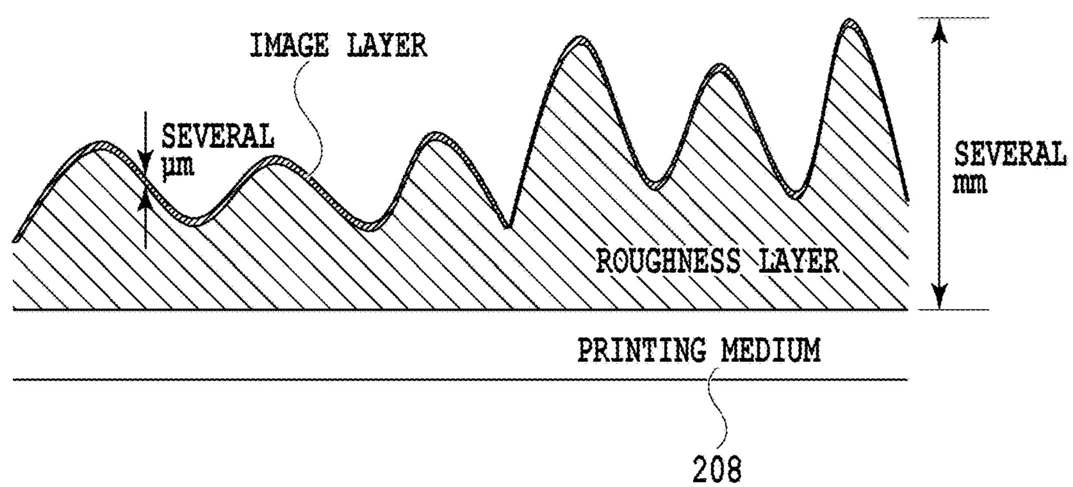
FIG. 5 is a diagram showing an example of a stacked layer section of a roughness layer and an image layer in the first embodiment.

FIG. 5 is a diagram showing an example of a stacked layer section of the roughness layer and the image layer formed on the printing medium 208 by the image forming apparatus 200 performing the image forming operation in FIG. 4. As shown in FIG. 5, the roughness layer of the present embodiment is normally formed so as to be distributed with a height of about several mm. On the other hand, the image layer is formed so as to be distributed with a height of several μm. In the present embodiment, the image layer is formed on the roughness layer. Regarding this point, to be strict, the image layer has a height distribution different in a range of several μm, but in view of the proportion of the image layer to the stacked layer of the roughness layer and the image layer, a height of about several μm can be ignored. Because of this, in the present embodiment, only the height distribution of the roughness layer is taken into consideration. Of course, it may also be possible to take into consideration the height distribution of the image layer. In the present embodiment, the shape formed by the roughness layer or the roughness layer and the image layer is referred to as the "roughness shape".

<Range of Roughness Shape that can be Output>

In the case where the image forming apparatus 200 forms a roughness shape based on the roughness shape data the input of which has been received, the roughness shape that can be output depends on, for example, the surface tension characteristics and the wetting spreading characteristics of ink, or the size of the image forming apparatus 200 itself and the output characteristics, such as the resolution that can be output.

Figure 6:
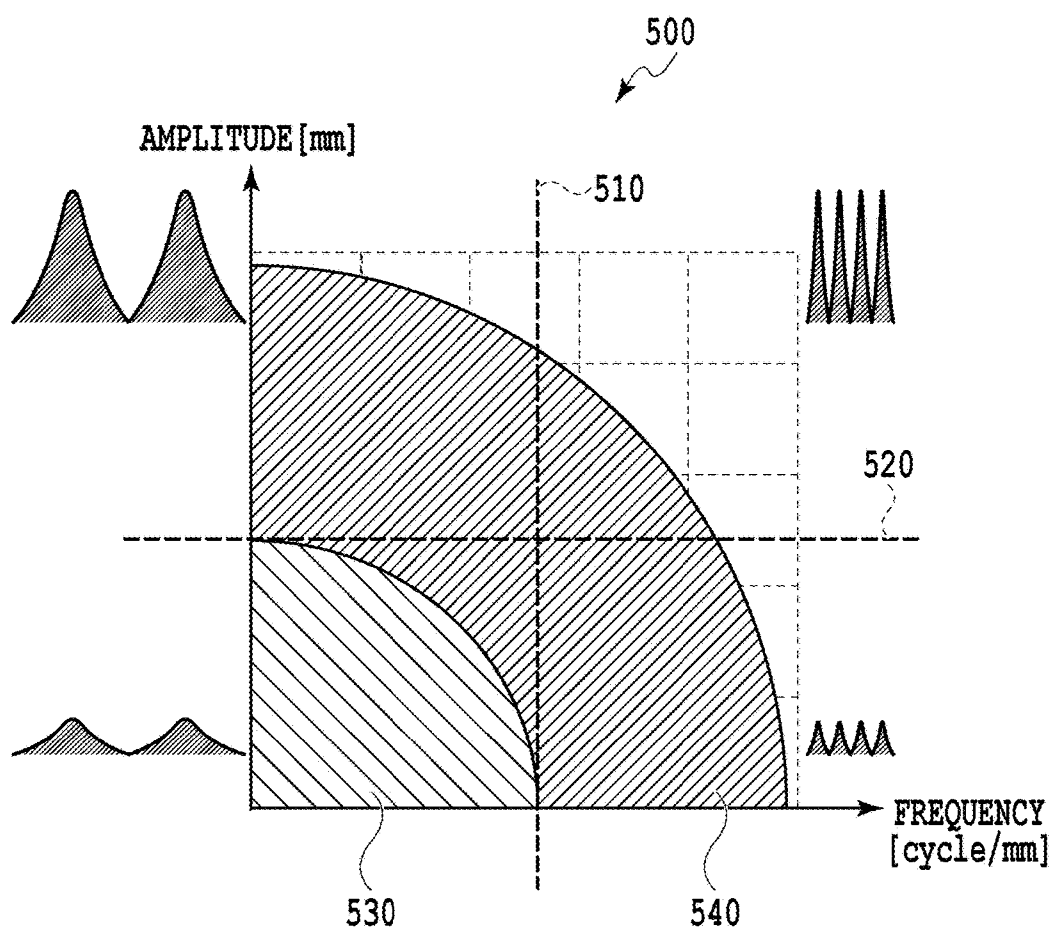
FIG. 6 is a schematic diagram showing output conditions of the image forming apparatus in the first embodiment.

FIG. 6 is a schematic diagram showing output conditions of the image forming apparatus 200 in the present embodiment. In a graph 500 in FIG. 6, the frequency is associated with the horizontal axis and the amplitude with the vertical axis.

The above-described frequency is an index for comparing the cycle of the convex portion and the concave portion in the roughness shape and in this example, the cycle of the convex portion and the concave portion in the spatial frequency per mm is used. Although details will be described later, in the present embodiment, a frequency F of the roughness shape is calculated from the height distribution of the roughness shape and by comparing the frequency F with the frequency of the graph 500, whether the roughness shape is within the output possible range of the image forming apparatus 200 is determined.

A frequency upper limit 510 indicates the upper limit of the frequency at which it is possible for the image forming apparatus 200 to form a roughness shape with a high reproducibility and as a value that the frequency upper limit 510 of the present embodiment can take, 11.8 cycle/mm is shown as an example. This indicates that it is no longer possible for the image forming apparatus 200 to form a roughness shape with a high reproducibility in the case where the bottom area of the convex portion and the concave portion exceeds about 42 μm (i.e., 84 μm per cycle). Here, 42 μm corresponds to the size of one pixel of 600 dpi.

The above-described amplitude is an index for comparing the height of the roughness shape and in this example, mm (millimeter) is used. Although details will be described later, in the present embodiment, a height maximum value H of the roughness shape is acquired from the height distribution of the roughness shape and by comparing the height maximum value H with the amplitude of the graph 500, whether the roughness shape is within the output possible range of the image forming apparatus 200 is determined.

An amplitude upper limit 520 indicates the upper limit of the amplitude at which it is possible for the image forming apparatus 200 to form a roughness shape with a high reproducibility, and as a value that the amplitude upper limit 520 of the present embodiment can take, 2 mm is shown as an example. This indicates that it is no longer possible for the image forming apparatus 200 to form a roughness shape with a high reproducibility in the case where the height of the convex portion exceeds about 2 mm.

An output possible range 530 indicates a range in which it is possible for the image forming apparatus 200 to form a roughness shape with a high reproducibility. That is, for the roughness shape data corresponding to the output possible range 530, it is possible for the image forming apparatus 200 to form an output that reproduces the roughness shape specified by the roughness shape data. The output possible range 530 of the present embodiment corresponds to an area defined by an arc connecting the "vertical axis: amplitude 2 mm" and the "horizontal axis: 11.8 cycle/mm". The frequency and the amplitude are in a mutual-dependence relationship. For example, for a high-frequency roughness shape, the cycle of the concave portion and the convex portion becomes high, and therefore, it becomes difficult to output a roughness shape having a sharp angle in the convex portion the amplitude of which has a height higher than or equal to a fixed height in view of the wetting spreading characteristics of ink or the like. On the contrary, for a roughness shape with a large amplitude, a bottom area of the convex portion in accordance with the height is necessary in view of the wetting spreading characteristics of ink or the like, and therefore, the frequency is limited accordingly. The arc that defines the output possible range 530 results from the above-described mutual-dependence relationship between the frequency and the amplitude.

A texture maintaining range 540 indicates a range in which it is possible for the image forming apparatus 200 to reproduce the texture of the roughness shape specified by the roughness shape data by the host 100 correcting the roughness shape data. To the texture maintaining range 540 of the present embodiment, an area defined by an arc connecting the "vertical axis: amplitude 10 mm" and the "horizontal axis: 94.5 cycle/mm" corresponds. There is an area that is outside the output possible range 530 even though the frequency upper limit 510 and the amplitude upper limit 520 of the image forming apparatus 200 are satisfied. For this area, it is possible to cause the image forming apparatus 200 to output a structure with a higher reproducibility by correcting the roughness shape data. For the roughness shape data included in the texture maintaining range 540 although the frequency upper limit 510 and the amplitude upper limit 520 are not satisfied, it is not possible to cause the image forming apparatus 200 to output a structure unless some steps are taken. However, by correcting the roughness shape data included in the texture maintaining range 540 such as this, it is possible to cause the image forming apparatus 200 to output a structure that is an approximation of the roughness shape represented by the roughness shape data.

In the present embodiment, the host (image processing apparatus) 100 compares the height distribution of the roughness shape and the output conditions (the frequency upper limit 510, the amplitude upper limit 520, the output possible range 530, the texture maintaining range 540). Even in the case where the roughness shape data not included in the output possible range 530 is input as the results of the comparison, the roughness shape data is corrected on a condition that the roughness shape data is included within the texture maintaining range 540. Due to this, it is possible for the image forming apparatus 200 to output a roughness shape in which a desired texture is maintained. Each numerical value described above is an example and the numerical value is not limited to the illustrated numerical value.

<Function Block>

Figure 7:
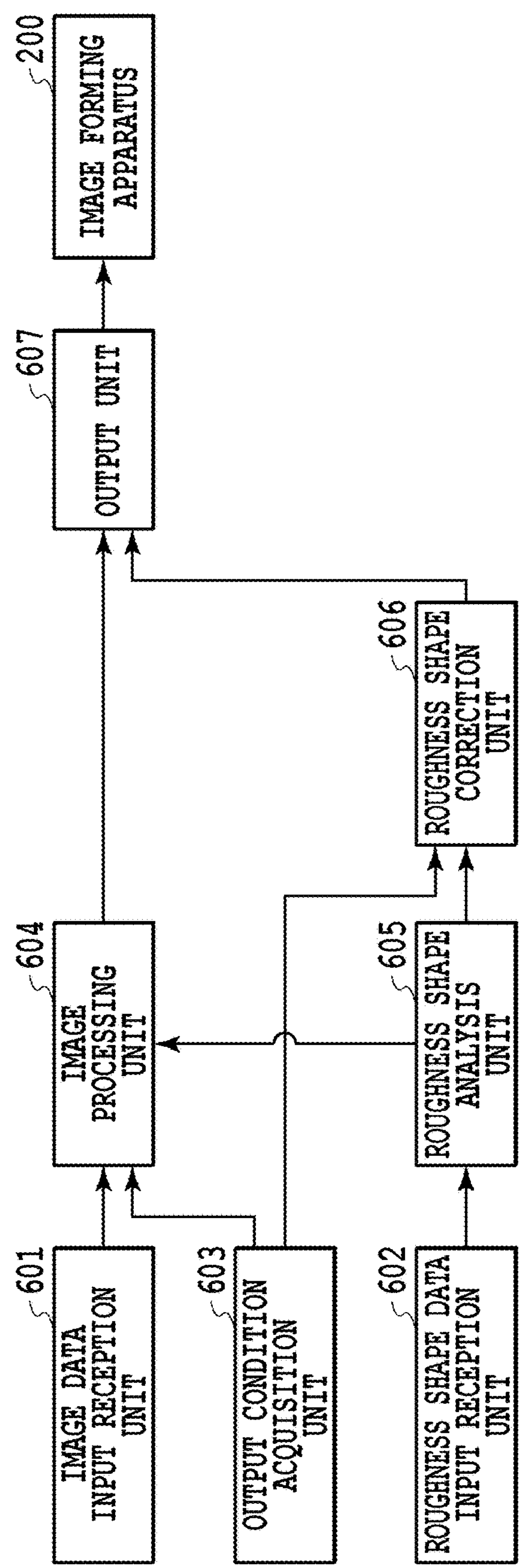
FIG. 7 is a block diagram showing a function configuration of the image forming system in the first embodiment.

FIG. 7 is a block diagram showing a function configuration of the image forming system 1 in the present embodiment. The image forming system 1 includes an image data input reception unit 601, a roughness shape data input reception unit 602, an output condition acquisition unit 603, an image processing unit 604, a roughness shape analysis unit 605, a roughness shape correction unit 606, an output unit 607, and the image forming apparatus 200.

The image data input reception unit 601 temporarily stores the image data the input from a user of which has been received via the input unit 103 or the like in the memory 102 or the external storage device 104. The image data is data that is referred to in the case where the image layer shown in FIG. 5 is formed and is converted into image data that can be output by the image forming apparatus 200 by the image processing unit 604, to be described later. Similarly, the roughness shape data input reception unit 602 temporarily stores the roughness shape data the input from a user of which has been received via the input unit 103 or the like in the memory 102 or the external storage device 104. The roughness shape data is data that is referred to in the case where the roughness layer shown in FIG. 5 is formed and includes various kinds of information specifying the roughness shape, which is a three-dimensional shape. In the present embodiment, an example is explained in which the image data and the roughness shape data are received as inputs of different pieces of data, but in the image data, for example, information specifying the roughness shape may be included. In this case, it is possible for the image forming system. 1 to form the image layer and the roughness layer by referring to the single image data.

The output condition acquisition unit 603 acquires the output conditions in the case where the image forming apparatus 200 forms an image on the printing medium 208. In the present embodiment, the output conditions correspond to the frequency upper limit 510, the amplitude upper limit 520, the output possible range 530, and the texture maintaining range 540. Further, the setting of the kind of paper to be used to form an image, the output setting of the image processing condition in the image processing unit 604 are also included in the output conditions of the present embodiment.

The image processing unit 604 calls the image data temporarily stored by the image data input reception unit 601 and performs various kinds of image processing. More specifically, the image processing unit 604 performs color conversion processing, halftone processing, etc., for the image data, and thus converts the image data into image data that can be output by the image forming apparatus 200.

The roughness shape analysis unit 605 calls the roughness shape data temporarily stored by the roughness shape data input reception unit 602 and analyzes the roughness shape data. Details of the procedure by the roughness shape analysis unit 605 will be described later. The roughness shape correction unit 606 performs processing to correct the roughness shape data in accordance with the output conditions acquired by the output condition acquisition unit 603 and the analysis results of the roughness shape analysis unit 605. Details of the procedure by the roughness shape correction unit 606 will be described later.

The output unit 607 transmits the image data that the image processing unit 604 outputs and the roughness shape data that the roughness shape correction unit 606 outputs to the image forming apparatus 200. The image forming apparatus 200 outputs a roughness shape and an image onto the printing medium 208 by performing the image forming operation shown in FIG. 4 and ejecting each printing material based on the image data and the roughness shape data received from the output unit 607.

<Processing Flowchart>

Figures 8, 8A:
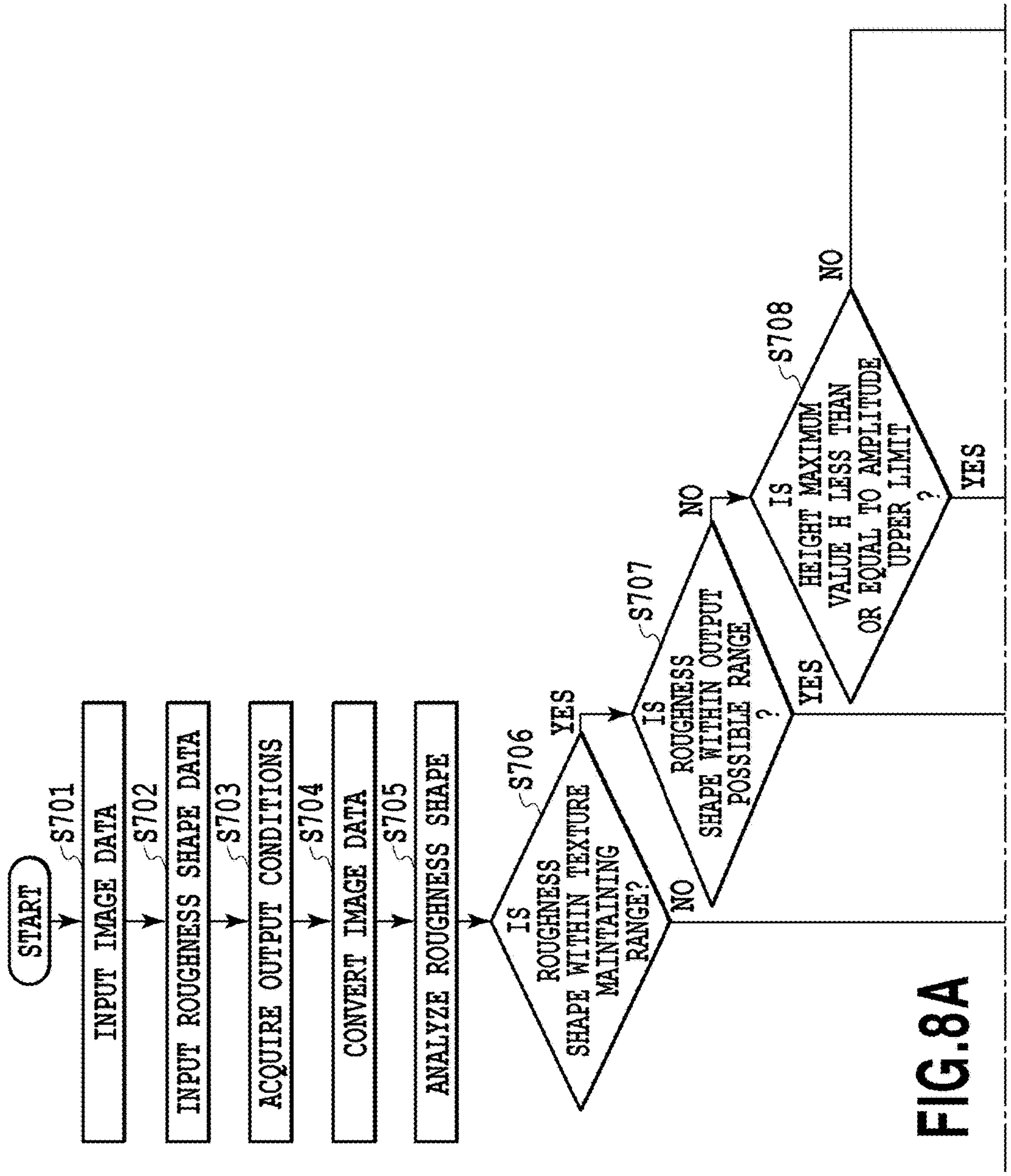
FIG. 8 is a diagram showing the relationship of FIGS. 8A and 8B.
FIG. 8A is a flowchart showing a procedure of the image forming system in the first embodiment.
Figure 8B:
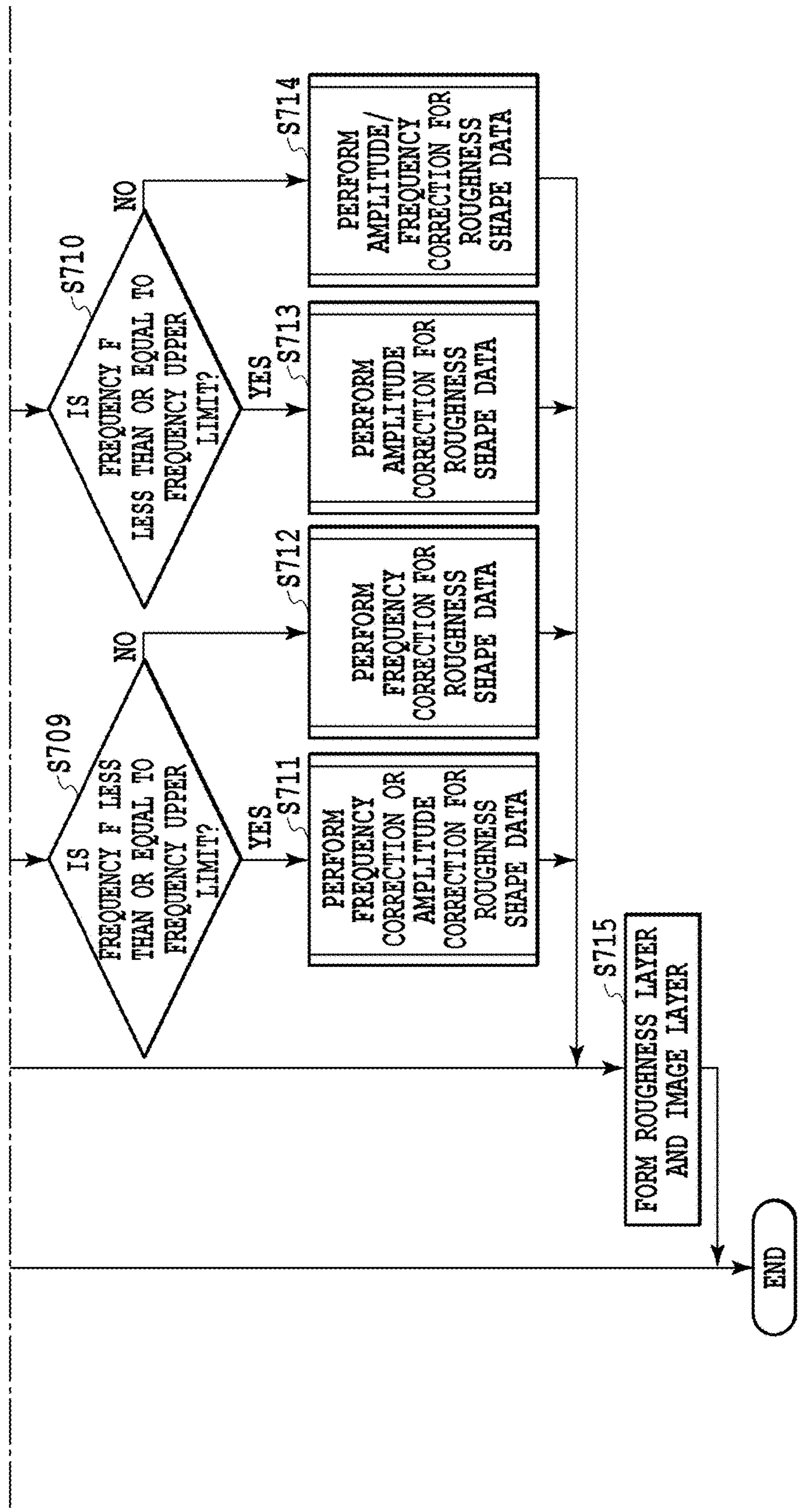
FIG. 8B is a flowchart showing a procedure of the image forming system in the first embodiment.

FIGS. 8A and 8B are flowcharts showing procedure performed by the image forming system 1 of the present embodiment. Hereinafter, with reference to the flowcharts in FIGS. 8A and 8B, the procedure of the correction processing of roughness shape data and the procedure of the image forming processing are explained, respectively. Reference letter S described below means the step in the flowchart and the processing in the flowcharts shown in FIGS. 8A and 8B is performed by the program code stored in the external storage device 104 being developed onto the memory 102 and executed by the CPU 101. Further, in the flowcharts in FIGS. 8A and 8B, S701 is performed by the image data input reception unit 601, S702 is performed by the roughness shape data input reception unit 602, and S703 is performed by the output condition acquisition unit 603. Furthermore, S704 is performed by the image processing unit 604 and S705 is performed by the roughness shape analysis unit 605. S706 to S711 are performed by the roughness shape correction unit 606 and S712 is performed by the image forming apparatus 200.

At S701, the image data input reception unit 601 receives an input of image data. In the present embodiment, as in the prior art, the image data to be input is image data specifying each value of R (red), G (green), and B (blue) at two-dimensional coordinates (x, y) on the surface of the printing medium. 208, but the present embodiment is not limited to this. For example, image data specifying each value of C (cyan), M (magenta), Y (yellow), and K (black) may be input.

At S702, the roughness shape data input reception unit 602 receives an input of roughness shape data. The roughness shape data includes two-dimensional coordinates (x, y) corresponding to the roughness shape to be formed on the printing medium 208 and information specifying the height at each coordinates. It is possible for the roughness shape analysis unit 605 and the roughness shape correction unit 606 to specify the height of the roughness shape corresponding to the two-dimensional coordinates by referring to the roughness shape data.

At S703, the output condition acquisition unit 603 acquires the output conditions. In the present embodiment, the output condition acquisition unit 603 acquires the output setting to be referred to at S704 and the output conditions, such as the output possible range 530, explained in FIG. 6. In the present embodiment, inputs of the output setting and the output conditions are received from a user via the input unit 103, but an aspect may be accepted in which values set in advance in the image forming system 1 are referred to as the output setting and the output conditions. Further, an aspect may be accepted in which the output conditions are acquired from an information processing apparatus externally connected via a network I/F (not shown) included in the host 100. Furthermore, an aspect may be accepted in which the host 100 acquires the output conditions by the output conditions held by the control unit 220 of the image forming apparatus 200 being transmitted to the host 100 in response to the establishment of the connection between the host 100 and the image forming apparatus 200 via the printer I/F 105.

At S704, the image processing unit 604 performs image processing for the image data the input of which has been received at S701. Specifically, the image processing unit 604 performs various kinds of image conversion processing for the image data. In the present embodiment, the image processing unit 604 performs image processing, for example, color conversion processing, halftone processing, etc., for the image data the input of which has been received. In more detail, the color conversion processing converts RGB image data the input of which has been received into image data of a plurality of color inks mounted on the image forming apparatus 200, for example, image data of CMYK. The color conversion processing is performed by using a color conversion table generally called an LUT (lookup table). The halftone processing converts image data of CMYK converted in the color conversion processing into binary halftone image data in which each color ink is ejected or not by using binarization processing, such as the error diffusion method. The converted binary halftone image data of each color is output to the image forming apparatus 200 by the output unit 607.

At S705, the roughness shape analysis unit 605 performs analysis processing for the roughness shape data the input of which has been received at S702. Specifically, the roughness shape analysis unit 605 acquires a histogram of the height distribution of the roughness shape specified by the roughness shape data from the roughness shape data and calculates the maximum value, the minimum value, and the difference of elevation, respectively, of the height distribution of the roughness shape by referring to the acquired histogram. Further, the roughness shape analysis unit 605 also calculates the frequency F of the height distribution by frequency-converting the acquired height distribution of the roughness shape in addition to the calculation of the maximum value, the minimum value, and the difference of elevation of the height distribution. In the present embodiment, the frequency conversion first applies a method, such as the two-dimensional Fourier transformation, to the height distribution of the roughness shape. In the data after the frequency conversion, an average value of intensity in the circumferential direction, which is the same frequency, is calculated and the intensity of each frequency is derived. Further, among the calculated intensities for each frequency, the frequency having the highest value is taken to be the frequency F of the height distribution. The method is not limited to this method provided that it is possible to specify a dominant frequency component in the height distribution. It may also be possible to simply take the frequency whose intensity is the maximum to be F without calculating an average in the circumferential direction or to take an average value in the entire frequency band to be F by multiplying the intensity for each frequency by a weight.

Figure 9:
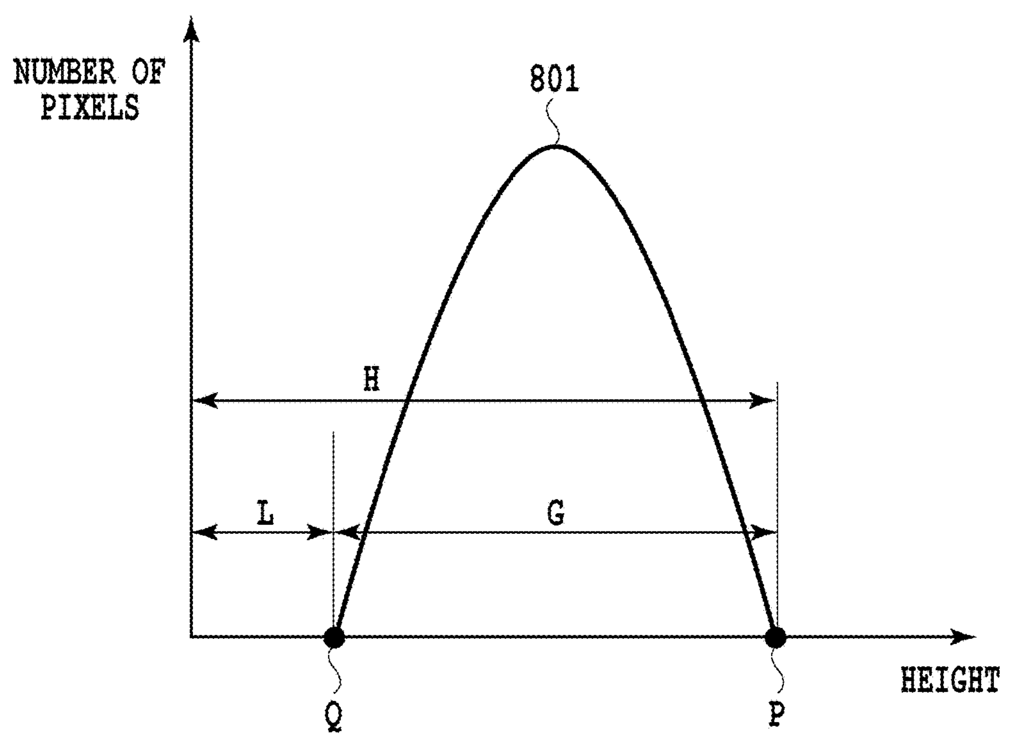
FIG. 9 is a diagram showing an example of a histogram of a height distribution of a roughness shape in the first embodiment.

FIG. 9 is a diagram showing an example of the histogram of the height distribution of a roughness shape. In the histogram in FIG. 9, the horizontal axis represents the height of the roughness shape and the vertical axis represents the number of pixels corresponding to the height of the roughness shape. A distribution curve 801 represents a distribution of the number of pixels corresponding to the height of the roughness shape. On the distribution curve 801, a point P indicates a height maximum value H of the roughness shape. On the distribution curve 801, a point Q indicates a height minimum value L of the roughness shape. A difference of elevation G between the height maximum value H and the height minimum value L corresponds to a difference value between the value of the point P and the value of the point Q. It is possible for the roughness shape analysis unit 605 to find the height maximum value H, the height minimum value L, the difference of elevation G, and the frequency F in the height distribution of the roughness shape by analyzing the roughness shape data at S705.

At S706 to S715, the roughness shape correction unit 606 determines a correction method of the roughness shape data in the case where the roughness shape data is determined to be outside the output possible range 530 by the output conditions acquired at S703 and the analysis results at S705.

At S706, the roughness shape correction unit 606 determines whether the roughness shape analyzed at S705 is within the texture maintaining range. In the case where the roughness shape is determined to be within the texture maintaining range 540 (S706: YES), the processing moves to S707. On the other hand, in the case where the roughness shape is determined to be outside the texture maintaining range (S706: NO), this flowchart is terminated without the output unit 607 transmitting the image data and the roughness shape data to the image forming apparatus 200. At this time, it may also be possible to cause the monitor 110 to display an error message via the video I/F 106.

At S707, the roughness shape correction unit 606 determines whether the roughness shape analyzed at S705 is within the output possible range. In the case where the roughness shape is determined to be within the output possible range (S707: YES), the processing moves to S715. On the other hand, in the case where the roughness shape is not determined to be within the output possible range 530 (S707: NO), the processing moves to S708.

At S708, the roughness shape correction unit 606 determines whether the height maximum value H of the roughness shape is less than or equal to the amplitude upper limit. In the case where the height maximum value H is less than or equal to the amplitude upper limit 520 (S708: YES), the processing moves to S709 and in the case where the height maximum value H is greater than the amplitude upper limit 520 (S708: NO), the processing moves to S710.

At S709, the roughness shape correction unit 606 determines whether the frequency F is less than or equal to the frequency upper limit. In the case where the frequency F is less than or equal to the frequency upper limit 510 (S709: YES), the processing moves to S711. In the case where the frequency F is higher than the frequency upper limit 510 (S709: NO), the processing moves to S712.

At step S710, the roughness shape correction unit 606 determines whether the frequency F is less than or equal to the frequency upper limit 510. In the case where the frequency F is less than or equal to the frequency upper limit 510 (S710: YES), the processing moves to S713 and in the case where the frequency F is higher than the frequency upper limit 510 (S710: NO), the processing moves to S714.

At S711, the roughness shape correction unit 606 performs frequency correction or amplitude correction for the roughness shape data. For example, it is possible for the roughness shape correction unit 606 to calculate amounts of correction with which the height maximum value H and the frequency F take values that fall within the output possible range 530, respectively, and to select a correction method with a smaller amount of correction. Details of the frequency correction and the frequency correction will be described later. After the correction processing for the roughness shape data is completed (S711), the processing moves to S715.

Figure 10:
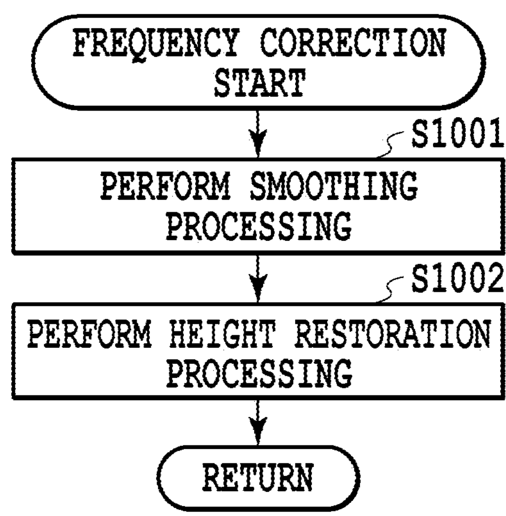
FIG. 10 is a flowchart showing a procedure of frequency correction in the first embodiment.

At step S712, the roughness shape correction unit 606 performs the frequency correction for the roughness shape data the input of which has been received at S702. FIG. 10 is a flowchart showing details of the procedure of the frequency correction (S712). At S1001, the roughness shape correction unit 606 performs smoothing processing for the roughness shape data. In the present embodiment, for example, by performing a convolution operation of the roughness shape data with a two-dimensional low-pass filer having low-frequency characteristics, the smoothing process of the roughness shape data is performed. The roughness shape correction unit 606 corrects the roughness shape data so that the frequency F becomes a value within the output possible range 530 by the smoothing correction (S1001).

Figures 11A, 11B, 11C:
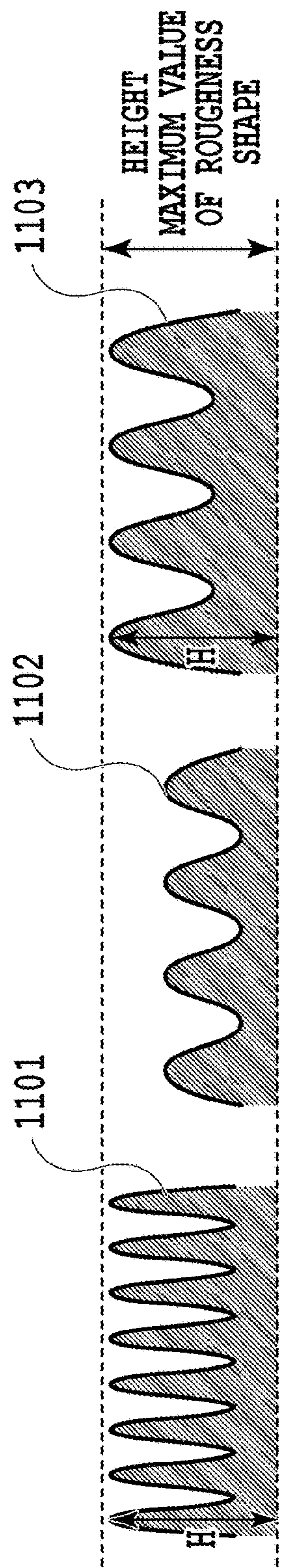
FIG. 11A is a schematic diagram showing a roughness shape before smoothing processing in the first embodiment.
FIG. 11B is a schematic diagram showing a roughness shape after smoothing processing in the first embodiment.
FIG. 11C is a schematic diagram showing a roughness shape after height restoration processing in the first embodiment.

FIGS. 11A to 11C are schematic diagrams showing a transition of a roughness shape before and after the frequency correction. FIG. 11A shows an example of a roughness shape 1101 specified by the roughness shape data before the smoothing processing and FIG. 11B shows an example of a roughness shape 1102 specified by the roughness shape data after the smoothing processing. As shown in FIGS. 11A and 11B, in the smoothing processing of the present embodiment, by the roughness portion of the roughness shape 1101 being smoothed, the contour of the periphery of the convex portion of the roughness shape 1102 makes a transition into a smooth shape.

At step S1002, the roughness shape correction unit 606 performs height restoration processing to restore the height reduced by the smoothing correction (S1001) for the roughness shape data. In the present embodiment, it may also be possible to perform the height restoration processing by, for example, multiplying the height in the height distribution of the roughness shape by a fixed coefficient. Further, it may also be possible to perform the height restoration processing by calling a coefficient corresponding to each height of the roughness shape from an LUT and by carrying out one-dimensional LUT conversion of the height of the roughness shape. The roughness shape correction unit 606 corrects the roughness shape data so that the height maximum value H is restored to the value of the height maximum value H of the roughness shape 1101 by the height restoration processing (S1002).

Returning to FIGS. 11A to 11C again, an example of a roughness shape 1103 specified by the roughness shape data after the height restoration processing is shown in FIG. 11C. In the height restoration processing of the present embodiment, the multiplication of a coefficient or one-dimensional LUT conversion is performed for each height of the roughness shape 1102. Due to this, as shown in FIGS. 11B and 11C, the height maximum value H of the roughness shape 1103 is restored to the same value as the height maximum value H of the roughness shape 1101. In this manner, by the smoothing processing and the height restoration processing being performed in the frequency correction (S712), it is possible to correct the roughness shape data to roughness shape data that can be output by the image forming apparatus 200 while maintaining the texture of the roughness shape.

Figure 12:
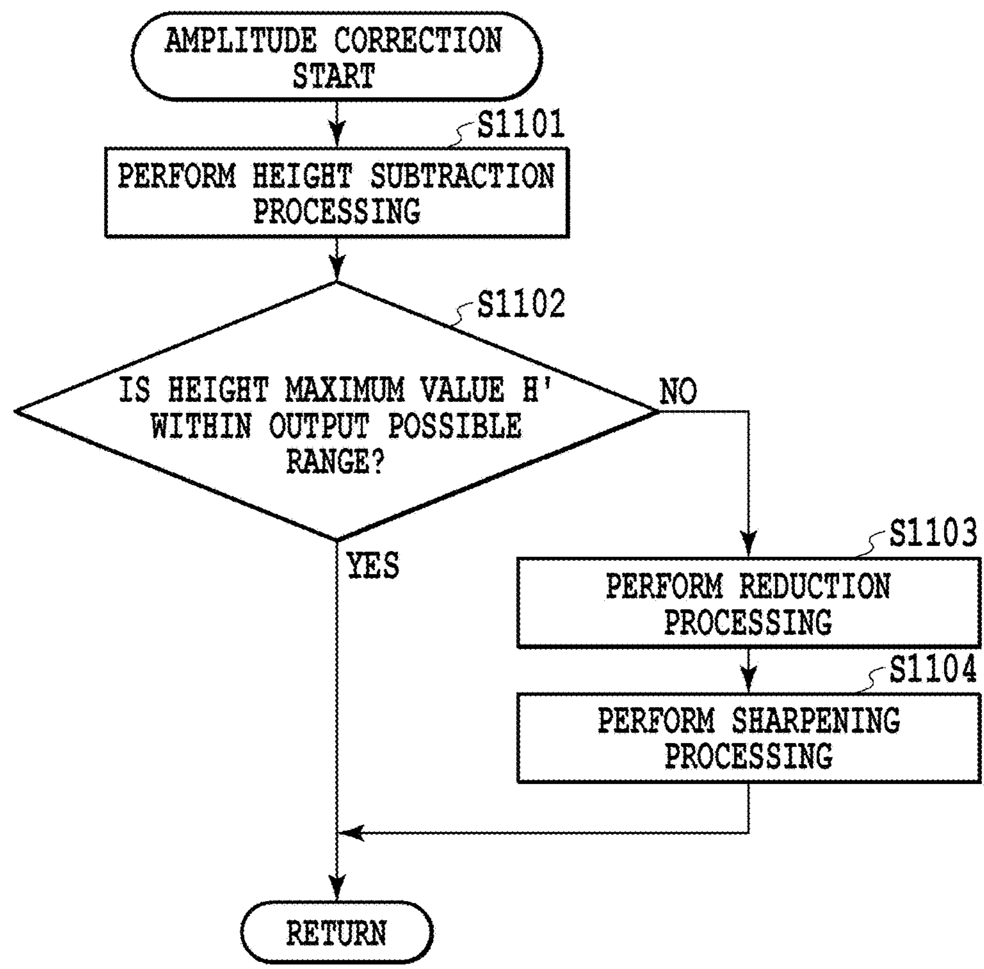
FIG. 12 is a flowchart showing a procedure of amplitude correction in the first embodiment.

At step S713, the roughness shape correction unit 606 performs the amplitude correction for the roughness shape data the input of which has been received at S702. FIG. 12 is a flowchart showing detailed procedure of the amplitude correction (S713). At S1101, the roughness shape correction unit 606 performs height subtraction processing for the roughness shape data. In the present embodiment, the roughness shape correction unit 606 first acquires each height of the roughness shape. Next, the roughness shape correction unit 606 performs processing to subtract the height minimum value L (FIG. 9) from each acquired height. The roughness shape correction unit 606 corrects the roughness shape data by the height subtraction processing (S1101) so that the height minimum value L of the roughness shape is subtracted while the difference of elevation G of the roughness shape is maintained.

Figures 13A, 13B:
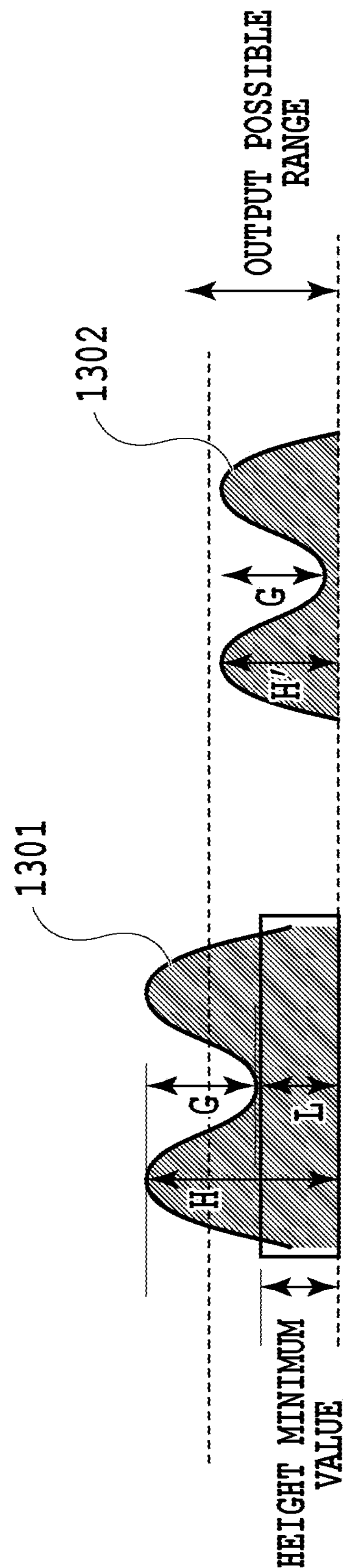
FIG. 13A is a schematic diagram showing a transition of a roughness shape before height subtraction processing in the first embodiment.
FIG. 13B is a schematic diagram showing a transition of a roughness shape after height subtraction processing in the first embodiment.

FIGS. 13A and 13B are schematic diagrams showing a transition of a roughness shape before and after the height subtraction processing. FIG. 13A shows an example of a roughness shape 1301 specified by the roughness shape data before the height subtraction processing and FIG. 13B shows an example of a roughness shape 1302 specified by the roughness shape data after the height subtraction processing. As shown in FIGS. 13A and 13B, in the height subtraction processing of the present embodiment, the height minimum value L is subtracted from each height of the roughness shape. Because of this, while the height maximum value H is corrected to the height maximum value H' within the amplitude output range, the difference of elevation G is kept at the same value before and after the height subtraction processing. As described above, by the height subtraction processing, it is possible to correct the roughness shape data to data that can be output by the image forming apparatus 200 while maintaining the texture of a roughness shape.

At S1102, the roughness shape correction unit 606 determines whether the height maximum value H' after the height subtraction processing is within the output possible range 530. In the case where the height maximum value H' is within the output possible range 530 (S1102: YES), it is made possible for the image forming apparatus 200 to output the roughness shape 1302 after the height subtraction processing, and therefore, the amplitude correction of the roughness shape data (S713) is terminated, and the processing moves to S715. In the case where the height maximum value H' is outside the output possible range 530 (S1102: NO), it is not possible for the image forming apparatus 200 to output the roughness shape 1302 after the height subtraction processing, and therefore, the processing moves to S1103 so that further correction is performed for the roughness shape data.

At S1103, the roughness shape correction unit 606 performs reduction processing for the roughness shape data after the height subtraction processing. In the present embodiment, the roughness shape correction unit 606 first acquires each height of the roughness shape after the height subtraction processing. Next, the roughness shape correction unit 606 calculates a reduction ratio coefficient so that the height maximum value H' after the height subtraction processing becomes a value within the output possible range 530. Next, the roughness shape correction unit 606 performs processing to multiply each height of the roughness shape by the reduction ratio coefficient.

Figures 14A, 14B, 14C:
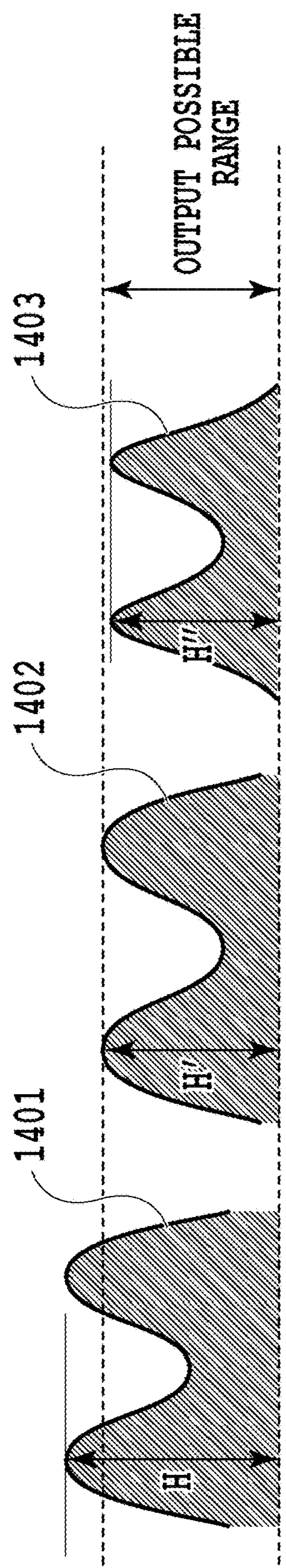
FIG. 14A is a schematic diagram showing a transition of a roughness shape before reduction processing in the first embodiment.
FIG. 14B is a schematic diagram showing a transition of a roughness shape after reduction processing in the first embodiment.
FIG. 14C is a schematic diagram showing a transition of a roughness shape after sharpening processing in the first embodiment.

FIGS. 14A to 14C are schematic diagrams showing a transition of a roughness shape during the reduction processing (S1103) and sharpening processing (S1104). FIG. 14A shows an example of a roughness shape 1401 specified by the roughness shape data before the reduction processing and FIG. 14B shows an example of a roughness shape 1402 specified by the roughness shape data after the reduction processing. As shown in FIGS. 14A and 14B, in the reduction processing of the present embodiment, the reduction ratio coefficient is applied to each height of the roughness shape 1401. Consequently, the height maximum value H is corrected to the height maximum value H' within the output possible range 530.

At S1104, the roughness shape correction unit 606 performs the sharpening processing for the roughness shape data after the reduction processing. In the present embodiment, the roughness shape correction unit 606 performs, for example, unsharp mask processing for the roughness shape data after the reduction processing. By performing the unsharp mask processing for the roughness shape data after the reduction processing, the convex portion in the roughness shape becomes a sharp shape.

Returning to FIGS. 14A to 14C again, FIG. 14C shows an example of a roughness shape 1403 specified by the roughness shape data after the sharpening processing. In the sharpening processing of the present embodiment, the unsharp mask processing is performed for the roughness shape data after the reduction processing. By the above-described processing, the shape of the periphery of the convex portion of the roughness shape 1403 becomes a sharp shape and on the other hand, the height maximum value H' and the difference of elevation G are kept at the same values before and after the sharpening processing. As described above, by the reduction processing and the sharpening processing, it is possible to correct the roughness shape data to data that can be output by the image forming apparatus 200 while maintaining the texture of the roughness shape.

Figure 15:
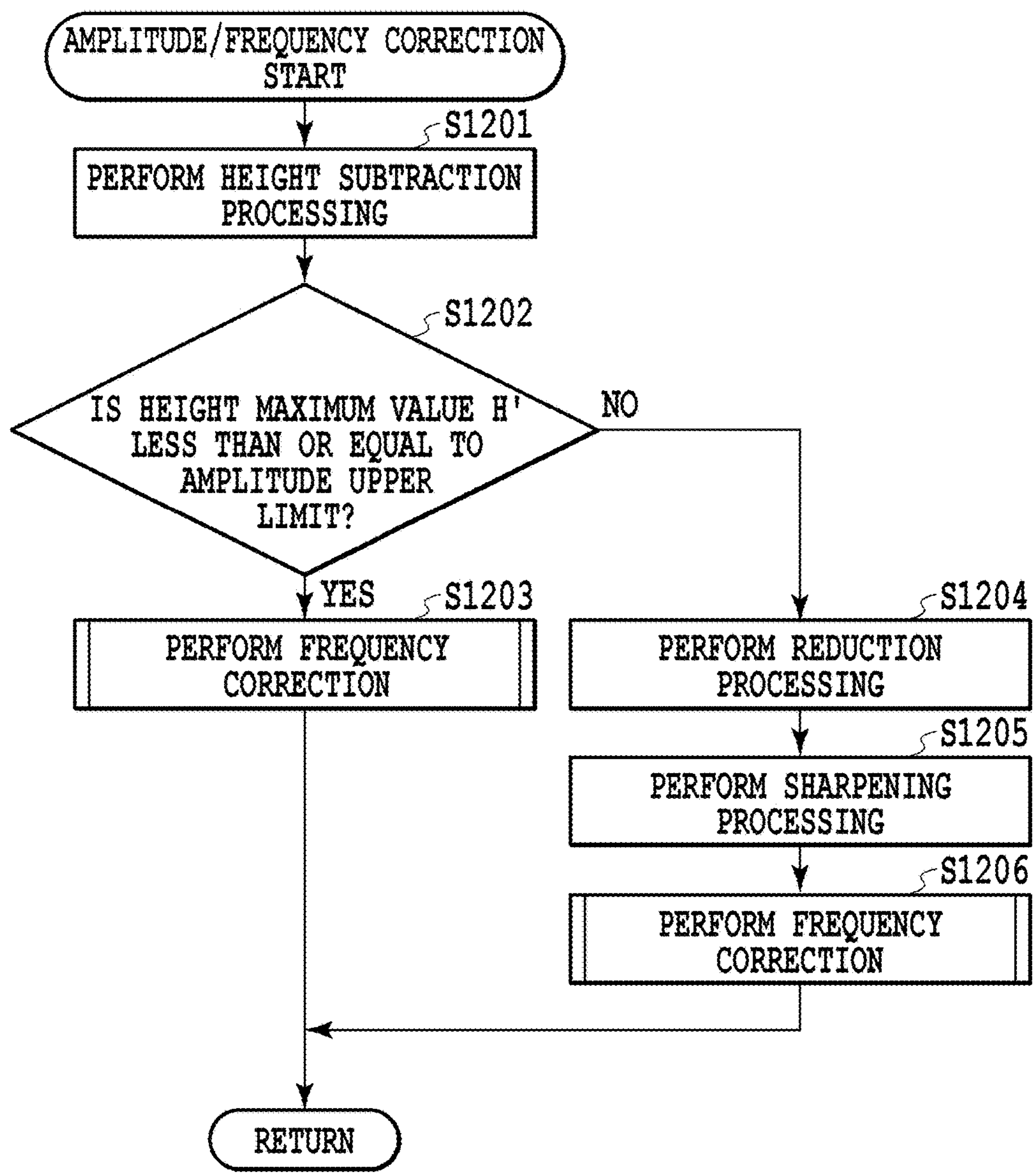
FIG. 15 is a flowchart showing a procedure of amplitude/frequency correction in the first embodiment.

Returning to FIGS. 8A and 8B again, at S714, the roughness shape correction unit 606 performs amplitude/frequency correction for the roughness shape data received at S702. FIG. 15 is a flowchart showing detailed processing of the amplitude/frequency correction (S714). At S1201, the roughness shape correction unit 606 performs the height subtraction processing for the roughness shape data. The height subtraction processing is the same as the height subtraction processing (S1101) explained in FIG. 12.

At S1202, the roughness shape correction unit 606 determines whether the height maximum value H' after the height subtraction processing is within the amplitude upper limit 520. In the case where the height maximum value H' is within the amplitude upper limit 520 (S1202: YES), the processing moves to S1203 and the roughness shape correction unit 606 performs the frequency correction for the roughness shape data.

In the case where the height maximum value H' is outside the amplitude upper limit 520 (S1202: NO), the processing moves to S1204 and the roughness shape correction unit 606 performs the reduction processing for the roughness shape data. The reduction processing is the same as the reduction processing (S1103) explained in FIG. 12. Next, at S1205, the roughness shape correction unit 606 performs the sharpening processing for the roughness shape data. The sharpening processing is the same as the sharpening processing (S1104) explained in FIG. 12. Next, at S1206, the roughness shape correction unit 606 performs the frequency correction for the roughness shape data. In the frequency correction at S1203 and S1205, the same processing as the roughness shape data frequency correction (FIGS. 8A and 8B, S712) is performed.

Returning to FIGS. 8A and 8B again, at S715, the image forming apparatus 200 receives binary halftone image data of each color and the roughness shape data after the correction from the output unit 607. The image forming apparatus 200 outputs an image layer from the binary halftone image data of each color and a roughness layer from the roughness shape data after the correction, respectively. The image forming apparatus 200 in the present embodiment outputs a three-dimensional shape image on the printing medium 208 by the image forming operation explained in FIG. 3 and FIG. 4. At this time, the roughness layer is formed first on the printing medium 208 and then the image layer is printed on the top of the formed roughness layer.

As above, the image processing apparatus of the present embodiment corrects roughness shape data so that the image forming apparatus 200 can stably produce an output while maintaining the texture of a roughness shape corresponding to the roughness shape data in accordance with the output conditions of the image forming apparatus 200. Due to this, it is possible for the image forming apparatus 200 to increase the reproducibility of the texture of the roughness shape corresponding to the roughness shape data. Further, by performing the correction processing of the roughness shape data according to the present embodiment, it is possible to extend the range of the roughness shape data in which the image forming apparatus 200 can reproduce a texture. The reason is that in the case where roughness shape data exceeding the output possible range of the image forming apparatus 200 is input, it is made possible to output a roughness shape with a desired texture being maintained by correcting the roughness shape data in accordance with the characteristics of the roughness shape. Because of this, even for roughness shape data in a range with which the image forming apparatus 200 is not compatible originally, it is possible to output an image in which the texture of a three-dimensional shape desired by a user is reproduced.

In the explanation of the present embodiment, the aspect is illustrated in which the ink jet image forming apparatus 200 performs printing directly on the printing medium 208, but the present embodiment is not limited to this. For example, it is also possible to apply the present embodiment by a method in which the image forming apparatus 200 once performs printing on a film or the like and the printed film or the like is pasted to a wood material or a wall surface. In the explanation of the present embodiment, it is explained that the height of the roughness layer is about several mm, but the height of the roughness layer is not limited to this. It is possible to apply the present embodiment to a roughness shape having any size and shape. Further, in the explanation of the present embodiment, the aspect is explained in which the image forming system 1 receives the input of roughness shape data, but the present embodiment is not limited to this. What is required is the ability to acquire information for specifying a roughness shape and it is also possible to estimate a roughness shape from image data and to generate roughness shape data from the estimation results.

Second Embodiment

In the present embodiment, an aspect is explained in which roughness shape data the input of which has been received is divided into a plurality of areas and the correction explained in the first embodiment is performed for the divided roughness shape data. In the explanation of the present embodiment, the same reference letters or numerals are attached to the same configurations as those of the first embodiment and explanation of duplicated contents is omitted.

Figure 16:
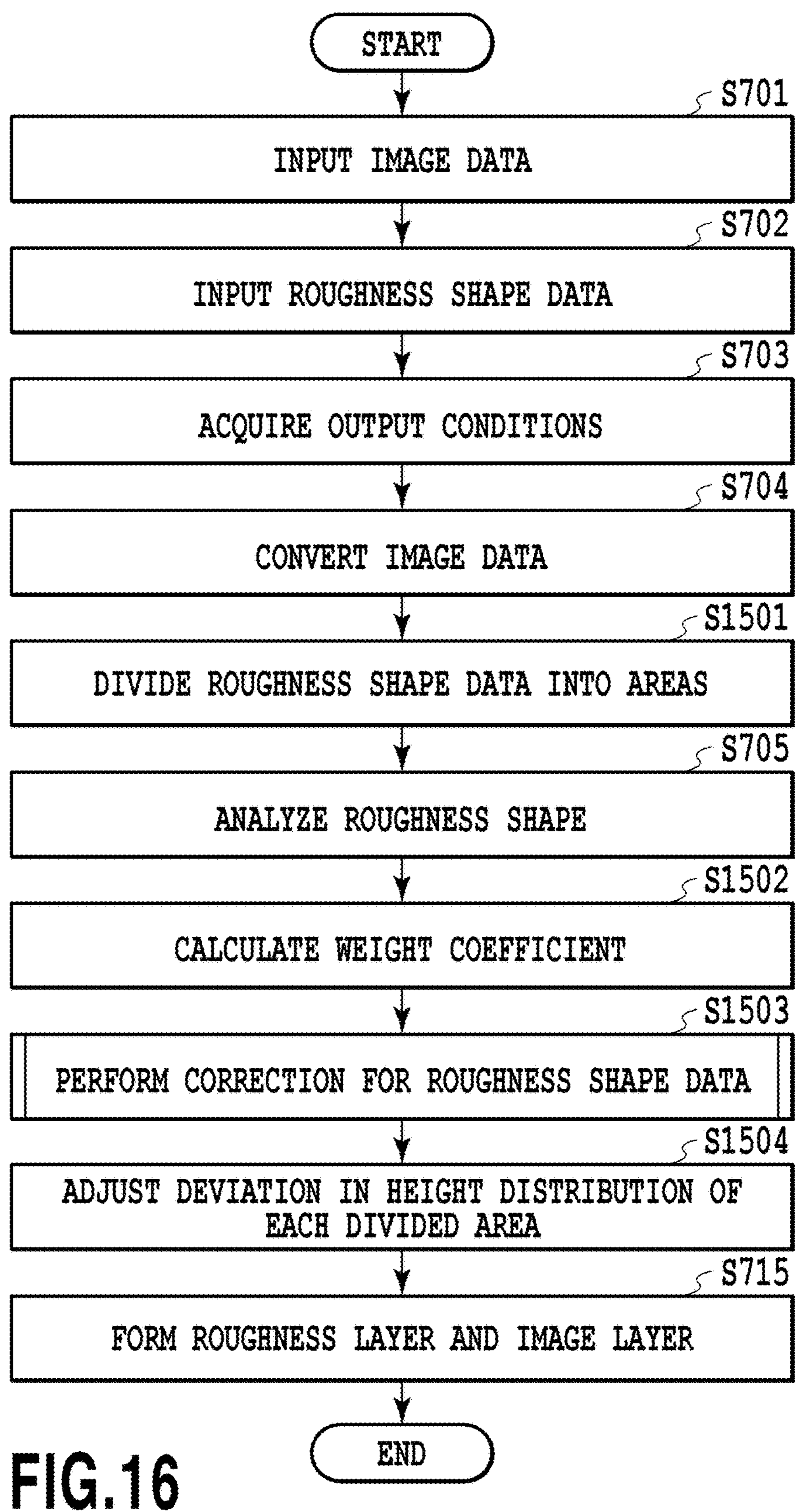
FIG. 16 is a flowchart showing a procedure of an image forming system in a second embodiment.
Figure 17:
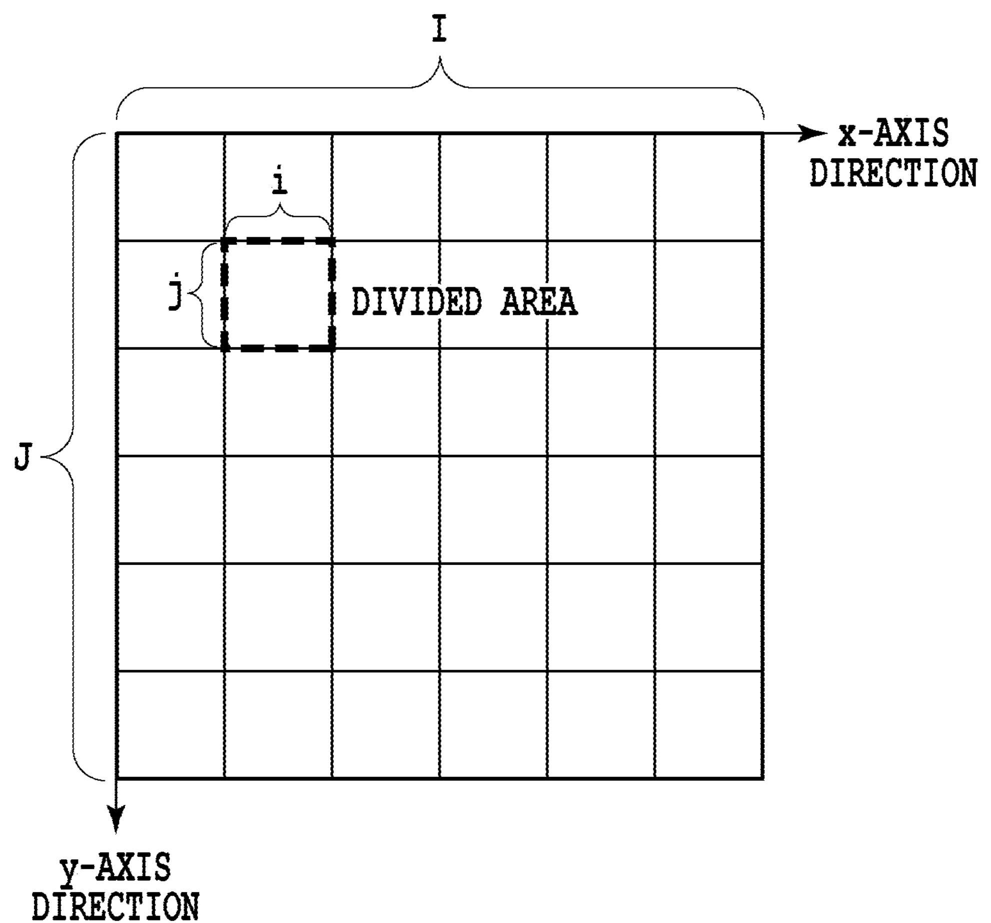
FIG. 17 is a diagram showing an example in which roughness shape data is divided into a plurality of areas in the second embodiment.

FIG. 16 is a flowchart showing a procedure performed by the image forming system 1 of the present embodiment. In the flowchart shown in FIG. 16, the processing at S701 to S704 is the same as that of the first embodiment, and therefore, explanation thereof is omitted. At S1501, the roughness shape data the input of which has been received at S702 is divided into a plurality of areas. FIG. 17 is a diagram showing an example in which roughness shape data in two-dimensional coordinates (x, y) is divided into a plurality of areas. In the present embodiment, the roughness shape data shown in FIG. 17 consists of (number I of pixels in x-axis direction)×(number J of pixels in y-axis direction) and is divided into I×J areas, i.e., 36 areas in total. In the present embodiment also, the roughness shape data includes the two-dimensional coordinates (x, y) corresponding to a roughness shape to be formed on the printing medium 208 and information specifying the height at each coordinates.

At S705, the roughness shape analysis unit 605 performs analysis processing for the roughness shape data in each divided area divided at S1501. As the results of the analysis processing, as in the first embodiment, the maximum value, the minimum value, and the difference of elevation in the height distribution in each divided area and the frequency are calculated. Next, at S1502, the roughness shape correction unit 606 calculates a weight coefficient of each divided area based on the analysis results of each area calculated at S705. Specifically, the weight coefficient of each divided area is calculated by using the height maximum value H calculated for each divided area. The largest value among height maximum values $H_v$ (v=1, 2, . . . , 36) is taken to be Hv_max and the weight coefficient of the divided area with Hv_max is taken to be 1. The weight coefficient of a divided area other than the divided area with Hv_max is calculated by dividing the height maximum value Hv by Hv_max.

At S1503, the roughness shape correction unit 606 performs correction for the roughness shape data of each divided area. As in the first embodiment, for the roughness shape data of each divided area, the determination of whether the roughness shape data is within the output possible range (S706 to S707 in FIGS. 8A and 8B), the determination of the correction method (S708 to S710 in FIGS. 8A and 8B), and the correction processing (S711 to S714 in FIGS. 8A and 8B) are performed.

At S1504, the roughness shape correction unit 606 adjusts a deviation in the distribution of the height specified by the roughness shape data of each divided area by using the corrected roughness shape data of each divided area and the weight coefficient of each divided area calculated at S1502. Specifically, by multiplying the corrected roughness shape data of each divided area by the weight coefficient, the deviation in the distribution of the height specified by the roughness shape data of each divided area is adjusted. At S715, the image forming apparatus 200 outputs a three-dimensional shape image on the printing medium 208 based on the image data for which the processing at S704 has been performed and the roughness shape data for which the processing at S1503 and S1504 has been performed.

As explained above, the image processing apparatus of the present embodiment divides the roughness shape data the input of which has been received into a plurality of areas and performs correction for each piece of the roughness shape data adjusted by the weight coefficient of each divided area. Due to the configuration such as this, it is possible to correct roughness shape data so as to obtain a preferred roughness shape on the whole even in the case where, for example, only a part of the roughness shape is extremely high, in the case where only a part of the roughness shape is extremely low, or in the case of the roughness shape in which areas having different frequencies exit mixedly. Because of this, even in the case where roughness shape data exceeding the output possible range of the image forming apparatus 200 is input, it is possible to output a roughness shape maintaining a desired texture by correcting the roughness shape data by a correction method in accordance with the roughness shape.

Third Embodiment

In the above-described embodiments, explanation is given as to the method of correcting roughness shape data in the case where it is possible to maintain a desired texture by correcting the roughness shape data in accordance with the characteristics of the roughness shape. As described previously, the output by the image forming apparatus 200 is affected by the wetting spreading characteristics of ink or the like, and therefore, in the case where the roughness shape of an object to be reproduced has sharp shade, there is a possibility that the sharpness is lost. In the present embodiment, explanation is given as to a method of increasing a texture of a roughness shape of a structure that is output by the image forming apparatus 200 by controlling the color of an image layer to be formed on a roughness layer based on the appearance of the roughness shape output by the image forming apparatus 200 without performing correction for the roughness shape data. In the explanation of the present embodiment, the same reference letters or numerals are attached to the same configurations as those of the above-described embodiments and explanation of duplicated contents is omitted.

Figure 18:
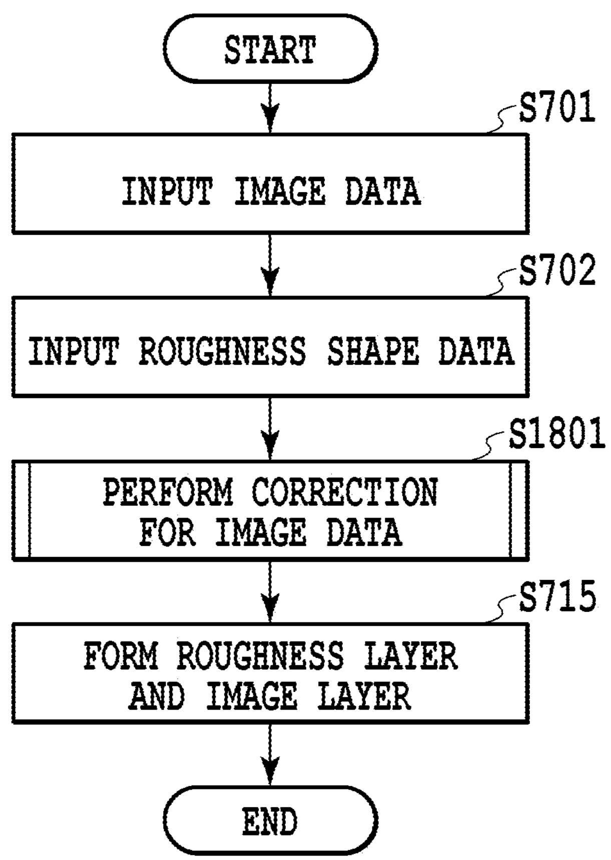
FIG. 18 is a flowchart showing a procedure of an image forming system in a third embodiment.

FIG. 18 is a flowchart showing a procedure performed by the image forming system 1 of the present embodiment. In the flowchart shown in FIG. 18, the processing other than the processing at S1801 is the same as that of the first embodiment, and therefore, explanation is omitted. At S1801, the image processing unit 604 acquires image data and performs correction processing for the image data in order to print an image on a roughness layer formed based on roughness shape data.

Figure 21:
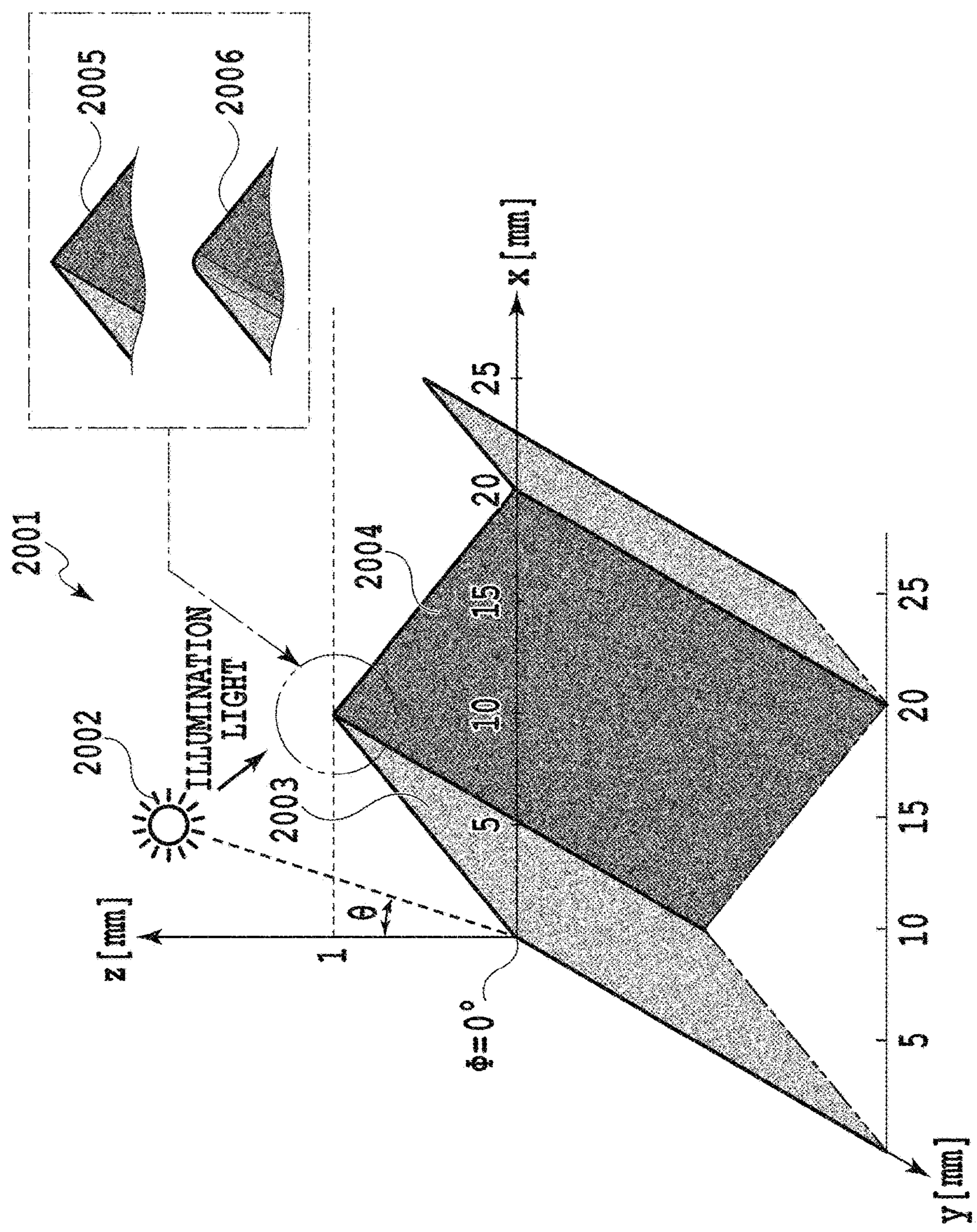
FIG. 21 is a schematic diagram showing a part of a roughness shape in the third embodiment.

FIG. 21 is a diagram schematically showing a part of a roughness shape corresponding to roughness shape data. In the three-dimensional (xyz) space in FIG. 21, the xy-plane specified by the x axis and the y axis corresponds to the surface of the printing medium 208 and a value specified by the z axis corresponds to the height H of a roughness shape 2001. It is assumed that the roughness shape 2001 has no inclination in the y-axis direction. In the roughness shape 2001, z gradually increases as x changes from 0 to 10 and z is constant with respect to y, and therefore, the roughness shape 2001 includes a plane 2003 in which the angle does not change. Similarly, in the roughness shape 2001, z gradually decreases as x changes from 10 to 20 and z is constant with respect to y. In the present embodiment, it is difficult to reproduce such a roughness shape itself. Consequently, in the present embodiment, in order to represent the texture of the roughness shape 2001, the image data representing the image layer is corrected in accordance the appearance of the roughness shape 2001.

It is assumed that the observation conditions of the roughness shape 2001 are that the incidence angle $\theta=6$ degrees and the rotation angle $\varphi=0$ degrees. That is, it is desirable for a structure obtained from the image forming apparatus 200 to be capable of reproducing the roughness shape corresponding to the roughness shape data in the case where the structure is observed under the specified observation conditions. Under these observation conditions, light illuminates the roughness shape 2001 from a light source 2002 and the normal of the plane 2003 agrees with the illumination direction from the light source 2002, and it is assumed that the illuminance on the plane 2003 due to the light source 2002 is 100% (this means the illuminance in the case where the illumination direction and the normal agree with each other). On the other hand, as shown by the schematic diagram in FIG. 21, the illumination light from the light source 2002 is illuminated to a plane 2004 obliquely, and therefore, compared to the illuminance on the plane 2003, the illuminance per unit area on the plane 2004 is relatively low.

FIGS. 22A to 22F are diagrams explaining reproduction of a roughness shape. FIGS. 22A and 22B are each a section diagram of a roughness shape. The horizontal axis represents the value of the x axis in the case where the surface of the printing medium 208 on which a roughness layer is formed is taken to be the xy-plane and the vertical axis represents the height. FIG. 22A shows the height distribution of input roughness shape data. FIG. 22B shows the height distribution of the results of the image forming apparatus 200 outputting a resin printing material and forming a structure based on the input roughness shape data. In FIG. 22A, a graph line 2101 of the height distribution of the input roughness shape data represents a sharp change in angle at x=10 mm. From this, it is known that the roughness shape specified by the roughness shape data of an object to be reproduced is originally a roughness shape having a sharp convex portion). In FIG. 22B, a graph line 2102 representing the height distribution of a structure is a smooth curve at x=10 mm. This means that it was not possible for the image forming apparatus 200 to actually produce a sharp convex portion due to the characteristics of the resin printing material and the generation process.

FIGS. 22C and 22D are diagrams explaining the appearance of the roughness shape. FIG. 22C shows an illuminance distribution 2103 of the roughness shape represented by the roughness shape in the case where the observation conditions are that the incidence angle θ=6 degrees and the rotation angle φ=0 degrees. The illuminance distribution shown in FIG. 22C is an ideal appearance. In FIG. 22C, the illuminance on the portion corresponding to the plane 2003 and the illuminance on the portion corresponding to the plane 2004 are different, and therefore, there is a contrast between the bright portion and the dark portion. Further, a convex portion 2005 shows a sharp change in angle, and therefore, the boundary between the bright portion and the dark portion is visually recognized clearly. On the other hand, FIG. 22D is a schematic diagram showing an illuminance distribution 2104 of the roughness shape corresponding to FIG. 22B. In FIG. 22D also, there is a contrast between the bright portion and the dark portion. However, a convex portion 2006 shows a change in angle duller than that of the convex portion 2005, and therefore, the boundary between the bright portion and the dark portion in the illuminance distribution 2104 of the structure is visually recognized with somewhat blurring. It is supposed that the roughness shape represents a contrast of shade as in FIG. 22C in this manner. Despite this, in the roughness shape of the structure actually formed by the image forming apparatus 200, even in the case where the roughness shape data is within the output possible range 530, the contrast of shade changes. With the above in mind, the image processing apparatus in the present embodiment represents the feature of the appearance to be lost because the image layer cannot reproduce the roughness shape in the image layer by correcting the image data in accordance the predicted appearance of the roughness shape.

<Image Data Correction Processing Flowchart>

Figure 19:
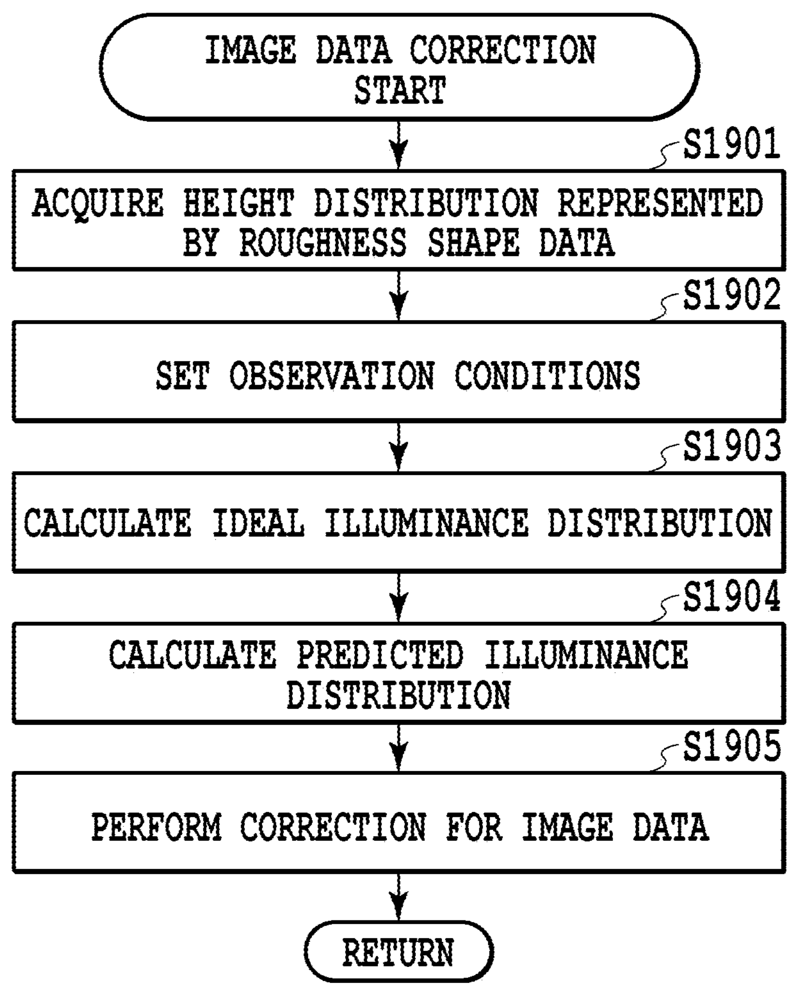
FIG. 19 is a flowchart showing a procedure of image data correction in the third embodiment.

FIG. 19 is a flowchart showing details of the processing of the image data correction (S1801). At S1901, the roughness shape analysis unit 605 calculates a height distribution HD' in the structure formed by the image forming apparatus 200 based on roughness shape data by analyzing the roughness shape data. First, the roughness shape analysis unit 605 acquires the height distribution HD of the roughness shape data. Next, the roughness shape analysis unit 605 calculates the height distribution HD' as formula (1) for the height distribution HD.

$$HD'(x,y)=HD(x,y)*F \qquad \text{(Formula 1)}$$

Here, F is a parameter in accordance with the output process of the image forming apparatus 200 and the change-in-shape characteristics due to the viscosity and the surface tension of the resin printing material, and the symbol * indicates that a convolution operation is performed. F has, for example, the Gaussian distribution and is used in the operation in formula (1) as a two-dimensional low-pass filter. By applying such characteristics, it is possible to simulate the characteristics that a sharp angle is dulled in the structure formed by the image forming apparatus 200 based on the roughness shape data.

Figure 20:
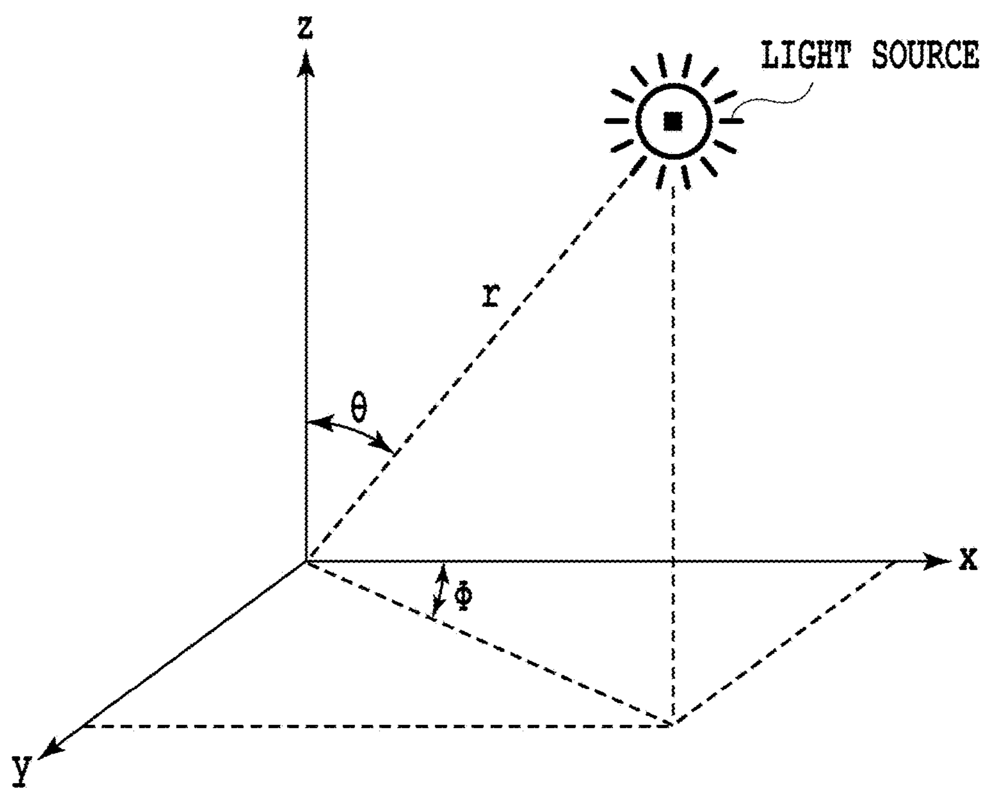
FIG. 20 is a schematic diagram showing a position relationship of an incidence angle θ and a rotation angle φ in the third embodiment.

At S1902, the roughness shape analysis unit 605 sets the observation conditions of the structure having the roughness shape. In the present embodiment, the input of the observation conditions is received along with the image data (S701) and the observation conditions include an incidence angle θi and a rotation angle φi of a light source with respect to the roughness shape. FIG. 20 is a schematic diagram showing a position relationship between the incidence angle θi and the rotation angle φi of the light source of the present embodiment. The incidence angle θi and the rotation angle φi are values that specify polar coordinates indicating the direction of the light source in the three (xyz)-dimensional space in the case where the surface of the printing medium 208 is taken to be the xy-plane. The incidence angle θi and the rotation angle φi are used to calculate the ideal illuminance distribution and the predicted illuminance distribution at S1903 and S1904, to be described later. In order to calculate the illuminance distribution strictly, it is necessary to set, in addition to the direction of the light source, several conditions, such as the portion of the roughness shape to be illuminated by the light source, the area of the illuminated portion, the intensity of the dispersed light corresponding to the illumination light, the spectral distribution, the illuminance of the light source, the deflection angle characteristics of the roughness shape, and the observation direction. Because of this, the incidence angle θi and the rotation angle φi that give the greatest influence to the appearance of the shade of the roughness shape, i.e., the direction of the illumination light, are set as the observation conditions. It can be said that the processing to set the observation conditions such as this by the roughness shape analysis unit 605 functions as a so-called observation condition setting unit.

At S1903, the roughness shape analysis unit 605 calculates the ideal illuminance distribution. The roughness shape analysis unit 605 performs processing to convert the height distribution HD of the roughness shape acquired at S1901 into a normal distribution θ, φ (x, y) indicating in which direction the fine surface of the roughness shape faces. In more detail, the normal distribution θ, φ (x, y) is calculated by calculating the gradient in the vicinity of the pixel of interest in the height distribution HD. By applying the observation conditions set at S1902, i.e., the incidence angle θi and the rotation angle φi, to the normal distribution θ, φ (x, y), it is possible to obtain an ideal illuminance distribution E1 (x, y) of the roughness shape of the object to be reproduced.

$$E1=\cos(\theta-\theta i,\varphi-\varphi i) \qquad \text{(Formula 2)}$$

At S1904, the roughness shape analysis unit 605 predicts an illuminance distribution of the roughness shape of a structure obtained by the image forming apparatus 200 outputting a resin printing material based on the roughness shape data. The roughness shape analysis unit 605 performs processing to convert the height distribution HD of the roughness shape acquired at S1901 into the normal distribution θ, φ (x, y) indicating in which direction the fine surface of the roughness shape faces. In more detail, the normal distribution θ, φ (x, y) is calculated by calculating the gradient in the vicinity of the pixel of interest in the height distribution HD. By applying the observation conditions set at S1902, i.e., the incidence angle θi and the rotation angle φi, to the normal distribution θ, φ (x, y) (Formula 2), it is possible to obtain a predicted illuminance distribution E2 (x, y) of the roughness shape of the output structure.

Here, with reference to FIGS. 22E and 22F, the illuminance distribution in the present embodiment is explained. FIGS. 22E and 22F are diagrams explaining the ideal illuminance distribution E1 and the predicted illumination distribution E2 at the time of being output, respectively, and the vertical axis represents the relative illuminance (%) and the horizontal axis represents x (mm) in the case where the surface of the printing medium 208 is taken to be the xy-plane. In the present embodiment, as on the plane 2003 (FIG. 21), the illuminance in the case where the illumination direction and the normal agree with each other is taken to be 100% and in the case where the illumination direction and the normal do not agree with each other as on the plane 2004 (FIG. 21), the illuminance drops in units of several %. As shown in FIG. 21, in the roughness shape 2001 having the convex portion 2005, the convex portion 2005 shows a sharp change in angle in the case where x becomes a value in the vicinity of 10 mm. In accordance with this, in a graph line 2105 of the before-correction illuminance distribution E1, the illuminance changes from 100% to 98% in the case where x becomes a value in the vicinity of 10 mm. On the other hand, in the roughness shape 2001 having a convex portion 2006, the convex portion 2006 shows a smooth change in angle in the case where x becomes a value in the vicinity of 10 mm. In accordance with this, in a graph line 2106 of the after-correction illuminance distribution E2, the illuminance changes from 100% to 98% in the case where x becomes a value about between 8 mm and 12 mm.

Returning to the flowchart in FIG. 19 again, at S1905, the image processing unit 604 performs correction for the image data the input of which has been received at S701. At this time, the image processing unit 604 first calculates a correction coefficient for the image data from the ideal illuminance distribution E1 and the predicted illuminance distribution E2, and then, applies the calculated correction coefficient to the image data. It is possible to find the correction coefficient for the image data from the ratio between the ideal illuminance distribution E1 and the predicted illuminance distribution E2 and for example, it is possible to use formula (3) below.

$$\text{correction coefficient}=E1/E2 \quad \text{(formula 3)}$$

It can be said that the processing to calculate a correction coefficient such as this by the image processing unit 604 functions as a correction coefficient calculation unit.

Here, in general, among the three-dimensional coordinate data of XYZ in the color space (e.g., sRGB, Adobe RGB, etc.) in which image data is specified, the "Y" component is a value representing illuminance. In the present embodiment, an illuminance distribution E is specified by the illumination direction from the light source and the normal and it is possible to calculate the illuminance distribution E as the "change in the Y component" among the three-dimensional coordinate data of XYZ. The image processing unit 604 converts the RGB image data the input of which has been received at S701 into three-dimensional coordinate data of XYZ based on the color space in which the image data is specified. Next, the image processing unit 604 applies the calculated correction coefficient to the "Y" component among the converted three-dimensional coordinate data of XYZ. For the application of the correction coefficient, it is possible to use, for example, formula (4) below.

$$Y'=Y(E1/E2) \quad \text{(formula 4)}$$

As described above, Y is the "Y" component of the three-dimensional coordinate data of XYZ converted from the image data and Y' corresponds to the "Y" component of the three-dimensional coordinate data of XYZ after the correction. The image processing unit 604 inversely converts the image data XY' Z (x, y) after the correction including Y' into RGB image data again. After this, the RGB image data after the inverse conversion is subjected to the color separation processing as in a general image processing apparatus and binary halftone image data of each color is generated, and the flow of the image data correction processing (FIG. 18) is terminated.

Figure 23A:
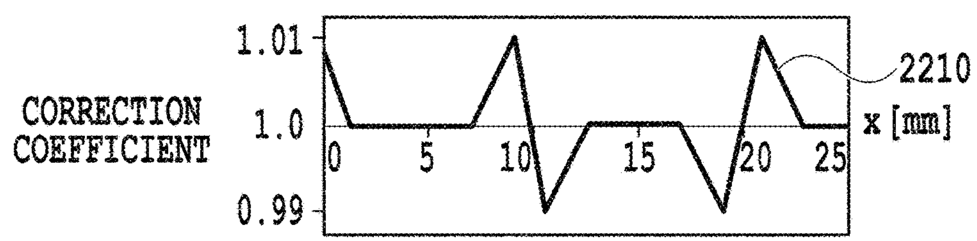
FIG. 23A is a diagram showing an example of a correction coefficient in the third embodiment.
Figure 23B:
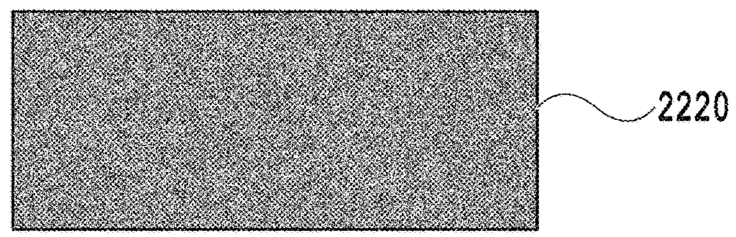
FIG. 23B is a diagram showing an output example of image data before correction in the third embodiment.
Figure 23C:
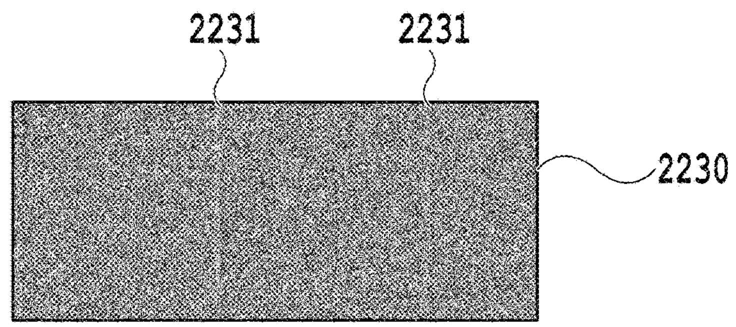
FIG. 23C is a diagram showing an output example of image data after correction in the third embodiment.

FIG. 23A is a diagram showing an example of the calculated correction coefficient. The correction coefficient is found from the ratio between the ideal illuminance distribution E1 and the predicted illuminance distribution E2 and a graph line 2210 representing the illuminance correction coefficient corresponds to the value of the ratio between the illuminance represented by the graph line 2105 of the ideal illuminance distribution E1 and the illuminance represented by the graph line 2106 of the predicted illuminance distribution E2. FIG. 23B is a schematic diagram showing an example of before-correction image data 2220 before the image processing unit 604 performs the image data correction (S1905) and FIG. 23C is a schematic diagram showing an example of after-correction image data 2230 after the image processing unit 604 performs the image data correction (S1905). In the present embodiment, the correction coefficient calculated from the ideal illuminance distribution E1 and the predicted illuminance distribution E2 is applied to the before-correction image data 2220 by the image processing unit 604 and the after-correction image data 2230 including an after-correction area 2231 representing the ratio of the appearance between E1 and E2 by a color is acquired. At S715, to be described later, the image layer based on the after-correction image data 2230 is printed on the roughness layer, and therefore, even in the case where the texture of the roughness shape is lost, it is possible to compensate for the appearance, such as sharpness, of the roughness shape by the after-correction area 2231.

After this, at S715, the image forming apparatus 200 receives the binary halftone image data of each color after the correction and the roughness shape data after the correction from the output unit 607. The image forming apparatus 200 outputs an image layer from the binary halftone image data of each color after the correction and a roughness layer from the roughness shape data or the roughness shape data after the correction, respectively.

As explained above, the image processing apparatus of the present embodiment controls the color of the image data so as to compensate for the sharpness of the roughness shape, which has been lost, in the structure output by the image forming apparatus 200 based on the roughness shape data. Due to this, it is possible to compensate for the texture of the roughness shape.

Modification Example

In the present embodiment, for simplification of explanation, the height distribution that does not change in the y-direction is illustrated, but it is needless to say that this explanation effectively applies to an arbitrary height distribution in the two-dimensional field of x and y.

In the present embodiment, the example is explained in which the formation of the roughness shape and the formation of the image are performed by the same image forming apparatus 200, but the example is not limited to this as long as the gist of predicting the texture of the roughness shape after correction and controlling the color of the image is followed. For example, such a configuration is also conceivable in which the image forming apparatus 200 forms an image for a roughness shape formed separately by an apparatus other than the image forming apparatus 200. At this time, it is sufficient to change the configuration so as to have an acquisition unit configured to acquire an after-correction height distribution and a before-correction height distribution of the roughness shape formed separately and an image forming unit configured to form an image layer based on the acquired information. Further, explanation is given on the assumption that the height of the roughness shape, which is the target of the present embodiment, is about 1 mm, but the height is not limited to this. Although the complicatedness or the like of the observation environment will change, it is possible to apply the present embodiment to a roughness shape having any size and shape.

In the present embodiment, the example is described in which the correction coefficient is calculated without taking into consideration the inclination of the fine surface, but in fact, a method is also conceivable that calculates the correction coefficient of image data by taking into consideration the change in the surface area due to the inclination of the plane of the roughness shape, the amount of ink, the surface coatability of ink, etc.

In the present embodiment, the example is shown in which the correction processing of image data is performed by using the "Y" component of the three-dimensional coordinate data of XYZ, but it may also be possible to perform calculation by using a value in any space. Further, in the present embodiment, after the steps, such as the acquisition of the after-correction height distribution of the roughness shape, the setting of the observation conditions, the calculation of the before-correction illuminance distribution, and the calculation of the after-correction illuminance distribution, are performed, the correction of image data is performed. In the modification example, it is also possible to obtain the similar effect by a method in which the calculation is simplified, the edge component is extracted by performing calculation processing, such as the second differentiation, for the data specifying the height distribution, the shade of the roughness is enhanced in a simple manner, etc. Further, in the setting of the observation conditions (S1902), only the direction of the illumination light from one light source is set, but in the actual observation environment, it is usual that there are influences of a plurality of light sources, reflected light from all the directions, etc. Consequently, it is also possible to set the omnidirectional illumination intensity from the periphery in all the directions as the observation condition. Due to this, it is made possible to more exactly reflect the rate of change in illuminance due to the inclination of the plane. Of course, it is possible to modify the correction coefficient by setting a predetermined coefficient in place of a value having a physical meaning.

Fourth Embodiment

In the first embodiment and the second embodiment, the method is explained in which the roughness shape data is corrected in the case where it is possible to maintain the desired texture by correcting the roughness shape data in accordance with the characteristics of the roughness shape. In the third embodiment, the method is explained in which the color of the image layer that is formed on the roughness layer is controlled based on the appearance of the roughness shape. In the present embodiment, the roughness shape data is corrected in accordance with the characteristics of the roughness shape. Further, based on the appearance of the roughness shape in the case where the image forming apparatus 200 outputs the roughness shape based on the corrected roughness shape data, the color of the image layer that is formed on the roughness layer is controlled. In the present embodiment, a method of improving the texture of the roughness shape of the structure output by the image forming apparatus 200 with the configuration such as this is explained. In the explanation of the present embodiment, the same reference letters or numerals are attached to the same configurations as those of the above-described embodiments and explanation of the duplicated contents is omitted.

Figure 24A:
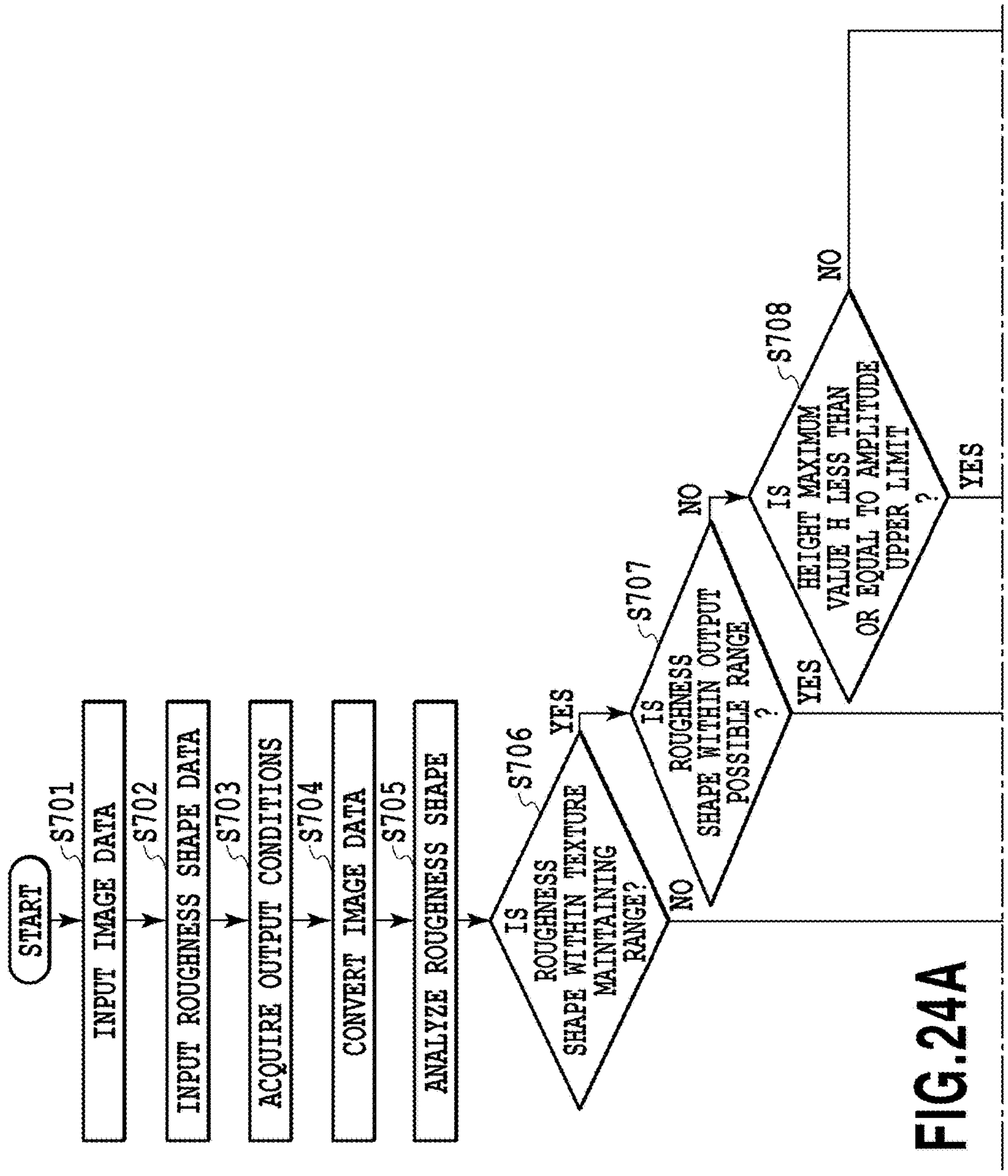
FIG. 24A is a flowchart showing a procedure of an image forming system in a fourth embodiment.
Figure 24B:
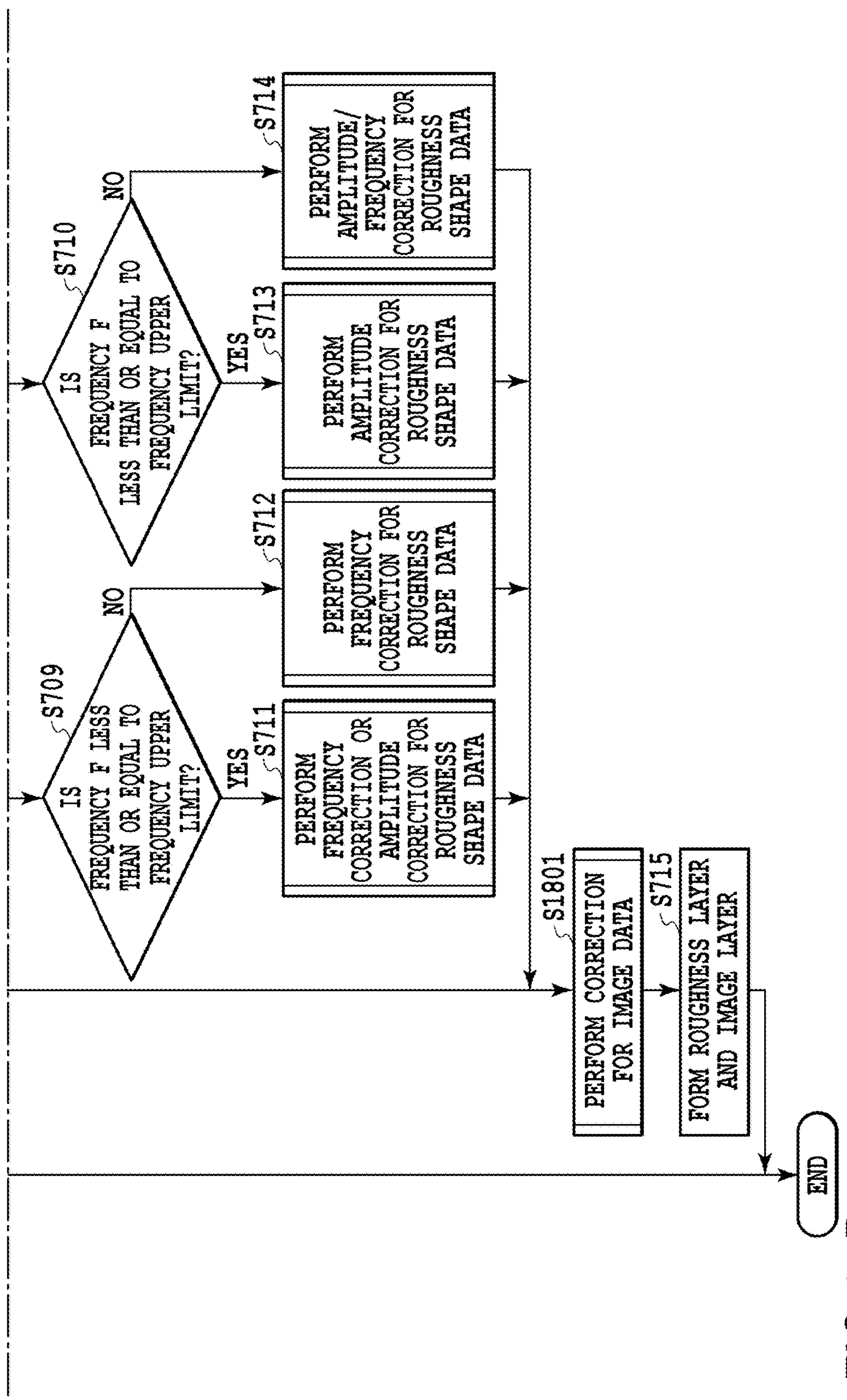
FIG. 24B is a flowchart showing a procedure of an image forming system in a fourth embodiment.

FIGS. 24A and 24B are flowcharts showing a procedure performed by the image forming system 1 of the present embodiment. In the flowcharts shown in FIGS. 24A and 24B, the processing other that at S1801 is the same as the processing of the first embodiment, and therefore, explanation is omitted. Further, the processing at S1801 is the same as that of the third embodiment, and therefore, explanation is omitted.

After each step of S707 and S711 to S714 is completed, the processing moves to S1801 before proceeding to S715. At S1801, the image processing unit 604 acquires image data and performs correction processing for the image data in order to print an image on a roughness layer that is formed based on roughness shape data. At S1901 in the image data correction (S1801), the roughness shape analysis unit 605 calculates the height distribution HD' in the structure formed by the image forming apparatus 200 based on the roughness shape data by analyzing the roughness shape data. The roughness shape data referred to here by the roughness shape analysis unit 605 may be uncorrected roughness shape data or corrected roughness shape data. In the case where the processing has moved from S707, the roughness shape data to be analyzed at S1901 is the same as the roughness shape data input at S702. In the case where the processing has moved from S711, S712, S713, and S714, the roughness shape data to be analyzed at S1901 is the same as the roughness shape data corrected at each step.

After this, at S715, the image forming apparatus 200 receives the binary halftone image data of each color after the correction and the roughness shape data after the correction from the output unit 607. The image forming apparatus 200 outputs an image layer from the binary halftone image data of each color after the correction and a roughness layer from the roughness shape data or the roughness shape data after the correction, respectively. In the present embodiment, it is intended to compensate for the appearance of the shade of the roughness shape, which has been lost due to the frequency correction (FIGS. 24A and 24B) of the roughness shape data, by controlling the color to be printed on the image layer.

As explained above, the image processing apparatus of the present embodiment controls the color represented by the image data so as to compensate for the sharpness of the roughness shape, which has been lost, in the structure output by the image forming apparatus 200 based on the roughness shape data. Due to this, it is possible to compensate for the texture of the roughness shape.

In the present embodiment, the aspect is explained in which the roughness shape that maintains the texture is output by predicting the texture expected from the roughness shape after the correction and controlling the color to be printed on the image layer. Similarly, it is also possible to apply the present invention to the following embodiment. For example, for the roughness shape having an amplitude outside the texture maintaining range 504, it is also possible to perform control so as to output a roughness shape that maintains the texture by predicting the texture expected from the roughness shape after the correction and controlling the color to be printed on the image layer in the image forming apparatus 200.

In the fourth embodiment, in the case where it is determined that the roughness shape is not within the texture maintaining range at S706, the processing is terminated without forming the roughness layer or the image layer. However, also in the case where the roughness shape is outside the texture maintaining range of the image forming apparatus 200, it may also be possible to cause the image forming apparatus 200 to form an output, although reproducibility is low. In this case, it is possible to improve reproducibility by correcting the image data for forming the image layer so that the difference between the output by the image forming apparatus 200 and the object to be reproduced is compensated for as at S1801 described above.

Fifth Embodiment

In the fourth embodiment, the method is explained in which the roughness shape data is corrected in accordance with the characteristics of the roughness shape and further, based on the appearance of the roughness shape, the color of the image layer that is formed on the roughness layer is controlled. In the present embodiment, a method of setting whether or not to perform the correction of the roughness layer and the image layer is explained. Specifically, a method of specifying whether or not to apply and output the roughness shape corrected at each of S711 to S714 or of specifying whether or not apply and output the image data corrected at S1801 via a user interface at S715 is explained.

Figure 25:
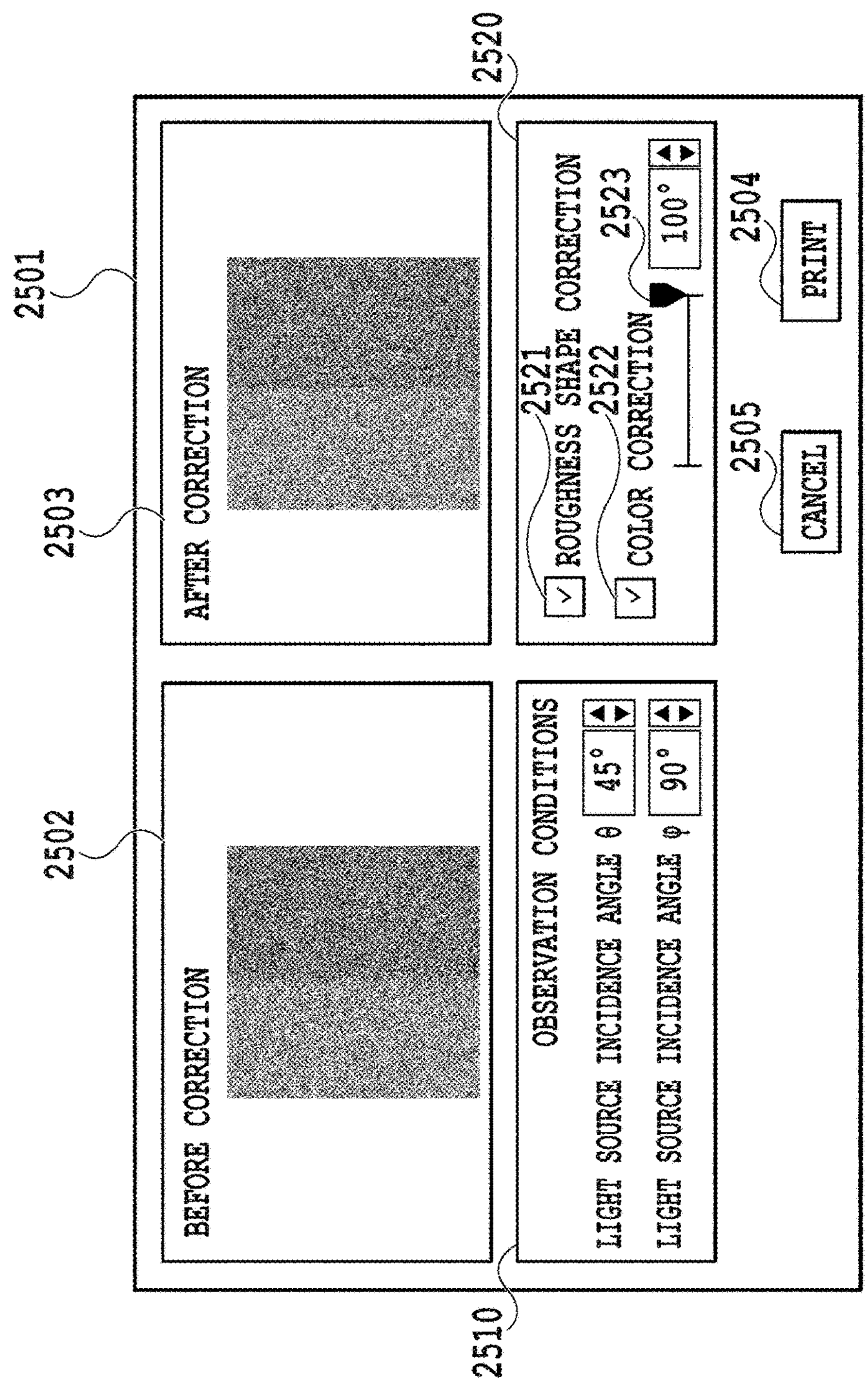
FIG. 25 is a diagram showing an example of a user interface in a fifth embodiment.

At S715, the CPU 101 displays a user interface 2501 for receiving an input of information relating to correction from a user on the monitor 110. FIG. 25 is an example of the user interface 2501 for setting whether or not to perform the correction of the roughness layer and the image layer.

A before-correction pre-viewer 2502 is a viewer for checking in advance the appearance of the output in the case where the correction of the roughness layer and the image layer is not performed. In the before-correction pre-viewer 2502, the appearance of the output that is output based on the roughness shape input at S702 and the image data converted at S704 under the observation conditions specified in an observation condition input unit 2510, to be described later, is displayed as an image. It is possible to calculate the appearance of the output from the roughness shape, the image data, and the observation conditions as in the explanation in FIGS. 22C and 22D.

An after-correction pre-viewer 2503 is a viewer for checking in advance the appearance of the output that is output based on the correction method specified in a correction condition input unit 2520, to be described later. In the after-correction pre-viewer 2503, the appearance of the output that is output based on the observation conditions specified in the observation condition input unit 2510 and the correction method specified in the correction condition input unit 2520 is displayed as an image.

The observation condition input unit 2510 is an interface for instructing and inputting conditions at the time of observing the output. In the present embodiment, the observation condition input unit 2510 includes a light source incidence angle input unit configured to input an incidence angle of a light source as a numerical value and a light source rotation angle input unit configured to input a rotation angle of a light source as a numerical value. In the case where the input conditions are changed, the images displayed in the before-correction pre-viewer 2502 and the after-correction pre-viewer 2503 are calculated under the input observation conditions and displayed after appropriately updated.

The correction condition input unit 2520 includes a roughness shape correction instruction unit 2501 and a color correction instruction unit 2522 and is an interface for instructing and inputting a correction condition of an image displayed in the after-correction pre-viewer 2503. In the present embodiment, in the case where the checkbox of the roughness shape correction instruction unit 2521 is on, the roughness shape corrected at each step of S711 to S714 is applied and the image in the after-correction pre-viewer 2503 is updated and displayed. In the case where the checkbox is off, the roughness shape input at S702 is applied and the image in the after-correction pre-viewer 2053 is updated and displayed. In the case where the checkbox of the color correction instruction unit 2522 is on, the appearance of the output to which the image data corrected at S1801 is applied is displayed in the after-correction pre-viewer 2503. In the case where the checkbox is off, the appearance of the output to which the image data converted at S704 is applied is displayed in the after-correction pre-viewer 2503. A correction intensity instruction unit 2523 constituting the color correction instruction unit 2522 specifies the amount of correction of image data to be corrected at S1801. The specified amount of correction is applied to the image data by being multiplied by the correction coefficient described in, for example, formula (3).

A Print button 2504 and a Cancel button 2505 are buttons to determine whether or not to perform the formation of the roughness layer and the image layer. In the case where the Print button 2504 is pressed down, the image forming system 1 forms the roughness layer and the image layer based on the correction condition input to the correction condition input unit 2520 at that point in time. In the case where the Cancel button 2505 is pressed down, the image forming system 1 terminates the processing without forming the roughness layer or the image layer.

As explained above, by using the user interface for receiving an input of information relating to correction from a user, it is made possible to check the appearance of the output in advance under the observation conditions and the correction condition specified by a user. Because of this, it is made possible to set the correction condition of the output desired by a user. There is a case where the effect of the image data correction that is applied in the present embodiment becomes less significant and detrimental as the observation environment departs from the specified observation environment. In such a case, it is possible to adopt a method in which an input reception unit configured to specify whether or not the observation conditions change is provided in the observation condition input unit 2510 and in the case where the observation conditions change, the image data correction is not performed. Further, a method is also conceivable in which a mask image or a range specified on the user interface is used and the correction condition is set and applied for each specified area.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment (s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the image processing apparatus of the present invention, it is possible to generate data for an image forming apparatus to output a structure so that the image forming apparatus can reproduce a structure with a roughness shape having a desired texture.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2015-156035, filed Aug. 6, 2015, and No. 2016-129141, filed Jun. 29, 2016, which are hereby incorporated by reference wherein in their entirety.

What is claimed is:

1. An image processing apparatus that supplies roughness shape data to an image forming apparatus that forms a roughness shape based on a roughness shape of an object to be reproduced, the image processing apparatus comprising:
- one or more processors; and
- one or more programs stored on the information processing apparatus, wherein the one or more programs cause the one or more processors to:
  - receive an input of information representing the roughness shape of the object to be reproduced;
  - acquire output characteristics relating to a roughness shape that the image forming apparatus can output; and
  - generate the roughness shape data that is supplied to the image forming apparatus based on the information representing the roughness shape of the object to be reproduced and the output characteristics,
- wherein the roughness shape data is generated so as to give more weight to at least one of a difference of elevation, a height, and sharpness of a convex portion of the roughness shape of the object to be reproduced.

2. The image processing apparatus according to claim 1, wherein, in determining, the instructions, when executed by the one or more processors, further causes the image processing apparatus to:
- determine whether or not to correct the information representing the roughness shape based on the information representing the roughness shape of the object to be reproduced and the output characteristics, and
  - in a case where it is determined that the information should be corrected, the roughness shape data is generated based on results of correcting the roughness shape specified by the information representing the roughness shape.

3. The image processing apparatus according to claim 2, wherein, in generating, the instructions, when executed by the one or more processors,
- further causes the image processing apparatus to:
- acquire a height distribution of the roughness shape of the object to be reproduced and to calculate a height of the roughness shape of the object to be reproduced and a spatial frequency of the roughness shape of the object to be reproduced from the height distribution;
- determine whether the height of the roughness shape of the object to be reproduced and the spatial frequency of the roughness shape of the object to be reproduced satisfy an output possible condition indicated by the output characteristics; and
- in a case where the output possible condition is not satisfied, generate the roughness shape data by correcting the received information representing the roughness shape based on the height of the roughness shape of the object to be reproduced and the spatial frequency of the roughness shape of the object to be reproduced.

4. The image processing apparatus according to claim 3, wherein, in acquiring, the instructions, when executed by the one or more processors, further cause the image processing apparatus to:
- acquire an output possible range in which the image forming apparatus can output the roughness shape with a high reproducibility; and
- generate the roughness shape data so that the height of the roughness shape of the object to be reproduced after the correction and the spatial frequency of the roughness shape of the object to be reproduced after the correction fall within the output possible range.

5. The image processing apparatus according to claim 2, wherein the instructions, when executed by the one or more processors, cause the image processing apparatus to:
- acquire an amplitude upper limit, which is an upper limit of an amplitude at which the image forming apparatus can output the roughness shape with a high reproducibility, and a frequency upper limit, which is an upper limit of a frequency at which the image forming apparatus can output the roughness shape with a high reproducibility, as the output characteristics; and
- determine whether the height of the roughness shape of the object to be reproduced is less than or equal to the amplitude upper limit and whether a spatial frequency of the roughness shape of the object to be reproduced is less than or equal to the frequency upper limit.

6. The image processing apparatus according to claim 5, wherein the instructions, when executed by the one or more processors, cause the image processing apparatus to:
- subtract a height minimum value in a height distribution from the height of the roughness shape of the object to be reproduced in a case where the height of the roughness shape of the object to be reproduced is higher than the amplitude upper limit.

7. The image processing apparatus according to claim 5, wherein the instructions, when executed by the one or more processors, cause the image processing apparatus to:
- perform a convolution operation of a height distribution with a filter having low-frequency characteristics in a case where the spatial frequency of the roughness shape of the object to be reproduced is higher than the frequency upper limit and restores the height of the roughness shape of the object to be reproduced, which has been reduced by the convolution operation.

8. The image processing apparatus according to claim 1, wherein the instructions, when executed by the one or more processors, further causes the image processing apparatus to:

correct image data representing an image layer that is formed on the roughness shape in accordance with an appearance of a roughness shape that the image forming apparatus outputs based on the roughness shape data.

9. The image processing apparatus according to claim 8, wherein, in correcting, the instructions, when executed by the one or more processors, cause the image processing apparatus to:

acquire an ideal roughness shape specified by the received information representing the roughness shape and a predicted roughness shape in a case where the received information representing the roughness shape is output in the image forming apparatus;

set observation conditions of the ideal roughness shape and the predicted roughness shape; and calculate the appearance of the ideal roughness shape and the appearance of the predicted roughness shape under the observation conditions and to calculate a correction coefficient for image data from the appearance of the ideal roughness shape and the appearance of the predicted roughness shape; and correct the image data based on the calculated correction coefficient.

10. The image processing apparatus according to claim 9, wherein the observation conditions include a direction of illumination light that is illuminated to the roughness shape from a light source, an illuminance distribution of the ideal roughness shape is found from the direction of the illumination light that is illuminated to the ideal roughness shape and an illuminance distribution of the predicted roughness shape is found from the direction of the illumination light that is illuminated to the predicted roughness shape, respectively, and the appearance of the ideal roughness shape is calculated from the illuminance distribution of the ideal roughness shape and the appearance of the predicted roughness shape is calculated from the illuminance distribution of the predicted roughness shape.

11. The image processing apparatus according to claim 1, wherein the received information representing the roughness shape is data representing the height of the roughness shape of the object to be reproduced for each pixel, and wherein the instructions, when executed by the one or more processors, further cause the image processing apparatus to:

divide the information representing the roughness shape into a plurality of areas;

analyze the information representing the roughness shape of each divided area;

calculate a weight coefficient of each of the divided areas based on results of the analysis; and adjust a deviation in the roughness shape in each of the divided areas from the roughness shape data of each of the divided areas generated and the calculated weight coefficient.

12. An image processing apparatus that supplies roughness shape data to an image forming apparatus that forms a roughness shape based on a roughness shape of an object to be reproduced, the image processing apparatus comprising:

one or more processors; and one or more programs stored on the information processing apparatus, wherein the one or more programs cause the one or more processors to:

receive an input of information representing the roughness shape of the object to be reproduced;

acquire output characteristics relating to a roughness shape that the image forming apparatus can output; and generate the roughness shape data that is supplied to the image forming apparatus based on the information representing the roughness shape of the object to be reproduced and the output characteristics, wherein the roughness shape data is generated so as to maintain at least one of a difference of elevation, a height, and sharpness of a convex portion of the roughness shape of the object to be reproduced.

13. An image forming apparatus that:

forms a roughness shape based on a roughness shape of an object to be reproduced;

receives generated roughness shape data from an image processing apparatus comprising:

one or more processors; and one or more programs stored on the information processing apparatus, wherein the one or more programs cause the one or more processors to:

receive an input of information representing the roughness shape of the object to be reproduced;

acquire output characteristics relating to a roughness shape that the image forming apparatus can output; and generate the roughness shape data representing the roughness shape based on the information representing the roughness shape of the object to be reproduced and the output characteristics; and forms the roughness shape based on the roughness shape data which has been received, wherein the roughness shape data is generated so as to give more weight to at least one of a difference of elevation, a height, and sharpness of a convex portion of the roughness shape of the object to be reproduced.

14. An image processing method of supplying roughness shape data to an image forming apparatus that forms a roughness shape based on a roughness shape of an object to be reproduced, the method comprising:

receiving an input of information representing the roughness shape of the object to be reproduced;

acquiring output characteristics relating to a roughness shape that the image forming apparatus can output; and generating the roughness shape data that is supplied to the image forming apparatus based on the information representing the roughness shape of the object to be reproduced and the output characteristics, wherein the roughness shape data is generated so as to give more weight to at least one of a difference of elevation, a height, and sharpness of a convex portion of the roughness shape of the object to be reproduced.

15. A non-transitory computer readable storage medium storing a program for causing a computer to function as an image processing apparatus that supplies roughness shape data to an image forming apparatus that forms a roughness shape based on a roughness shape of an object to be reproduced, wherein the image processing apparatus comprises:

at least one or more processors; and one or more programs stored on the information processing apparatus, wherein the one or more programs cause the one or more processors to:

receive an input of information representing the roughness shape of the object to be reproduced;

acquire output characteristics relating to a roughness shape that the image forming apparatus can output; and generate the roughness shape data that is supplied to the image forming apparatus based on the information representing the roughness shape of the object to be reproduced and the output characteristics, wherein the roughness shape data is generated so as to give more weight to at least one of a difference of elevation, a height, and sharpness of a convex portion of the roughness shape of the object to be reproduced.

16. An image processing method of supplying roughness shape data to an image forming apparatus that forms a roughness shape based on a roughness shape of an object to be reproduced, the method comprising:

receiving an input of information representing the roughness shape of the object to be reproduced;

acquiring output characteristics relating to a roughness shape that the image forming apparatus can output; and generating the roughness shape data that is supplied to the image forming apparatus based on the information representing the roughness shape of the object to be reproduced and the output characteristics, wherein the roughness shape data is generated so as to maintain at least one of a difference of elevation, height, and sharpness of a convex portion of the roughness shape of the object to be reproduced.

17. A non-transitory computer readable storage medium storing a program for causing a computer to function as an image processing apparatus that supplies roughness shape data to an image forming apparatus that forms a roughness shape based on a roughness shape of an object to be reproduced, wherein the image processing apparatus comprises:

at least one or more processors; and one or more programs stored on the information processing apparatus, wherein the one or more programs cause the one or more processors to:

receive an input of information representing the roughness shape of the object to be reproduced;

acquire output characteristics relating to a roughness shape that the image forming apparatus can output; and generate the roughness shape data that is supplied to the image forming apparatus based on the information representing the roughness shape of the object to be reproduced and the output characteristics, wherein the roughness shape data is generated so as to maintain at least one of a difference of elevation, a height, and sharpness of a convex portion of the roughness shape of the object to be reproduced.

* * * * *